United States Patent
Akkineni et al.

(10) Patent No.: US 10,409,620 B2
(45) Date of Patent: Sep. 10, 2019

(54) SPANNING TREE PROTOCOL WARM REBOOT SYSTEM

(71) Applicant: Dell Products L.P., Round Rock, TX (US)

(72) Inventors: Ravisekhar Akkineni, Telangana (IN); Saye Balasubramaniam Subramanian, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/880,325

(22) Filed: Jan. 25, 2018

(65) Prior Publication Data

US 2019/0227812 A1     Jul. 25, 2019

(51) Int. Cl.
| | |
|---|---|
| *H04L 12/46* | (2006.01) |
| *G06F 9/4401* | (2018.01) |
| *H04L 12/753* | (2013.01) |
| *H04L 12/935* | (2013.01) |
| *H04L 12/933* | (2013.01) |
| *H04L 12/24* | (2006.01) |

(52) U.S. Cl.
CPC ............ *G06F 9/4416* (2013.01); *H04L 41/12* (2013.01); *H04L 45/48* (2013.01); *H04L 49/15* (2013.01); *H04L 49/30* (2013.01)

(58) Field of Classification Search
CPC ....... H04L 45/02; H04L 45/48; H04L 45/586; H04L 61/6022; G06F 9/4416
See application file for complete search history.

(56) References Cited

U.S. PATENT DOCUMENTS

| | | | |
|---|---|---|---|
| 2007/0159987 A1 | 7/2007 | Khan et al. | |
| 2013/0170435 A1* | 7/2013 | Dinan ................ | H04L 45/50 370/328 |
| 2014/0362709 A1* | 12/2014 | Kashyap ................ | H04L 41/12 370/250 |
| 2018/0026844 A1* | 1/2018 | Smaak .................. | H04L 12/42 370/216 |

* cited by examiner

*Primary Examiner* — Wei Zhao
(74) *Attorney, Agent, or Firm* — Haynes and Boone, LLP

(57) ABSTRACT

An STP warm reboot system includes first switch device(s) including first switch ports, and a second switch device including second switch ports linked to respective first switch ports. During a warm reboot, the second switch device blocks designated-state second switch ports that are linked to first switch ports that have either an alternate role or a discarding state, redirects BPDUs identifying a designated peer port role and received on designated-state second switch ports from their respective linked first switch ports back to those first switch ports, and identifies topology change notification(s) received on the second switch ports. Subsequent to the warm reboot process, the second switch device reprograms the second switch ports that have experienced a state change during the warm reboot, and sends a topology change notification based on the identification of the topology state change notification received by the second switch ports during the warm reboot.

20 Claims, 21 Drawing Sheets

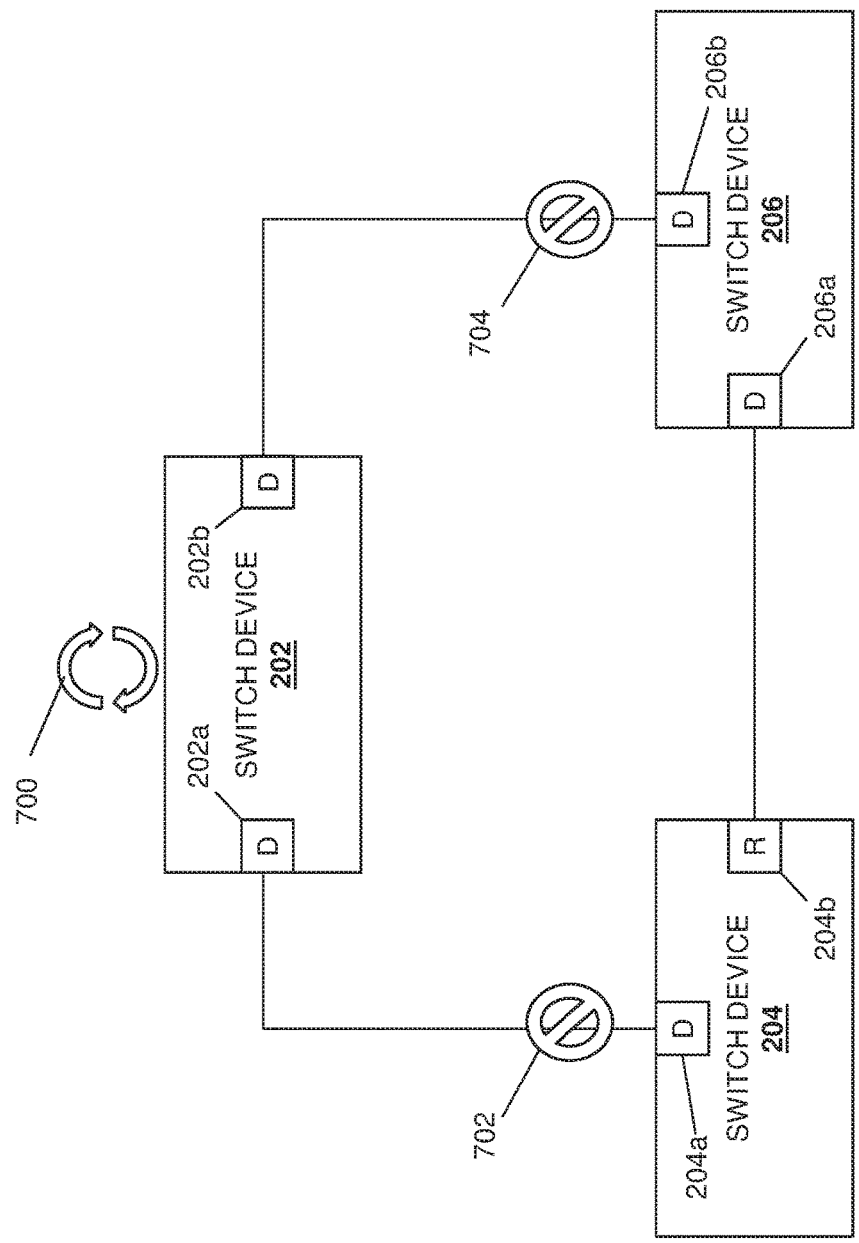

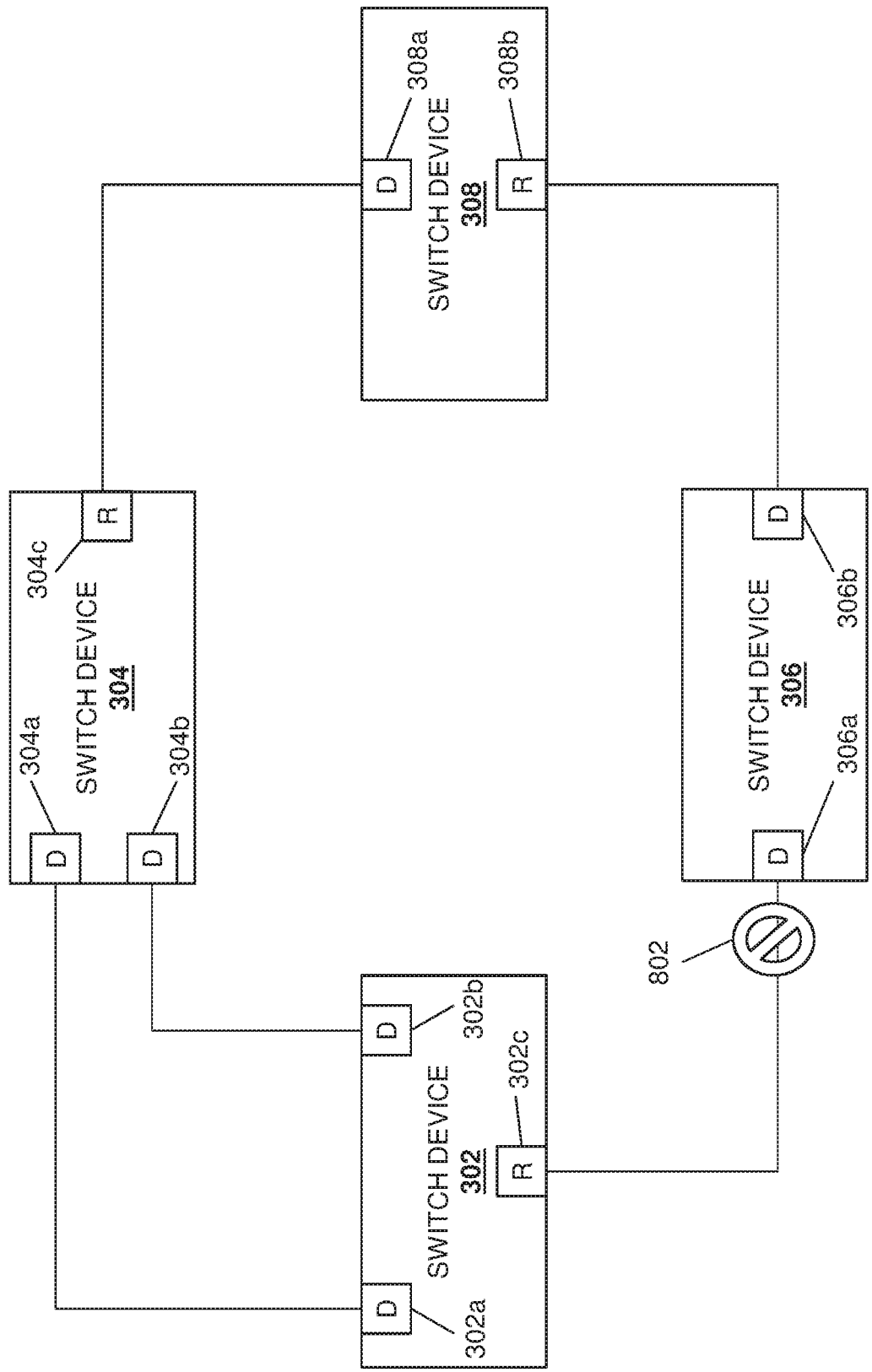

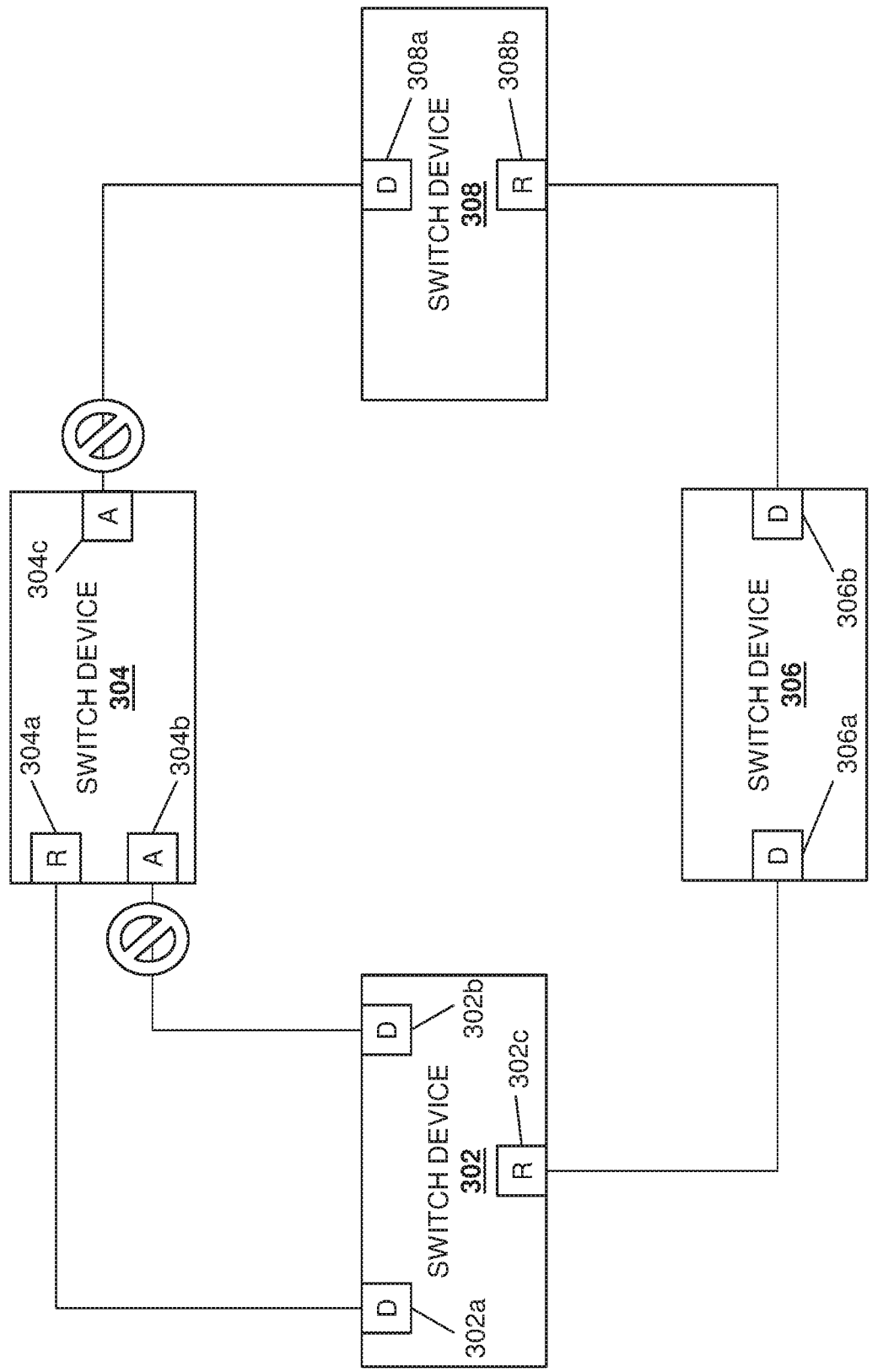

SPANNING TREE PROTOCOL WARM REBOOT SYSTEM

BACKGROUND

The present disclosure relates generally to information handling systems, and more particularly to performing a warm reboot process in information handling systems that utilize the spanning tree protocol.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, switch devices in networks, utilize the spanning tree protocol in order to build a logical, loop-free topology in those networks. For example, the spanning tree protocol may operate to create a spanning tree within a network of switch devices that operate as connected layer-2 bridges by disabling links that are not part of the spanning tree in order to leave a single active path between any two network nodes. However, the use of the spanning tree protocol can raise some issues in some situations such as, for example, when control plane software in the switch devices undergoes a "warm reboot" by resetting, restarting, or otherwise re-initializing. In response to such a warm reboot, the spanning tree protocol port states that are programmed in port hardware in the switch device remain the same until the control plane software is finished re-initializing and, once reinitialized, the spanning tree protocol causes port state machines to run, port role/states to be calculated, and the port hardware to be programmed. However, the warm reboot completion time for the switch device can be more than three times the root bridge switch device hello time (e.g., the time between each bridge protocol data unit (BPDU) sent on the root bridge switch device ports, typically set to 2 seconds), which can cause peer switch devices that has learned root information from a switch device that is undergoing a warm reboot process to assume they are no longer connected to a root bridge switch device and, in response, open up their ports and cause a resulting traffic loop. Furthermore, after warm reboot, the spanning tree protocol restarts the spanning tree port state machines, which can lead to network traffic disturbances (e.g., when port role/states are recalculated and ports that should be open are blocked.)

Accordingly, it would be desirable to provide an improved spanning tree protocol warm reboot system.

SUMMARY

According to one embodiment, an Information Handling System (IHS) includes a plurality to first ports; a processing system that is coupled to the plurality of first ports; and a memory system that is coupled to the processing system and that includes instructions that, when executed by the processing system, cause the processing system to provide a spanning tree protocol engine that is configured to: block each of the plurality of first ports that have a designated state and that are linked to respective second ports that have either an alternate role or a discarding state; redirect, for each of the plurality of first ports that have the designated state, bridge protocol data units (BPDUs) that identify a designated peer port role back to their source; and identify, on each of the plurality of first ports, topology change notifications received by those first ports; and wherein the spanning tree protocol engine is configured, subsequent to the warm reboot, to: reprogram at least some of the plurality of first ports that have experienced a state change during the warm reboot; and send, based on identifying the topology change notification received by the first ports during the warm reboot, a topology change notification.

BRIEF DESCRIPTION OF THE DRAWINGS

FIG. 7B is a schematic view illustrating the provisioning of a warm reboot in one of the switch devices in the network of FIG. 2.

FIG. 8D is a schematic view illustrating the provisioning of a warm reboot in one of the switch devices in the network of FIG. 3.

FIG. 8G is a schematic view illustrating the provisioning of a warm reboot in one of the switch devices in the network of FIG. 3.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
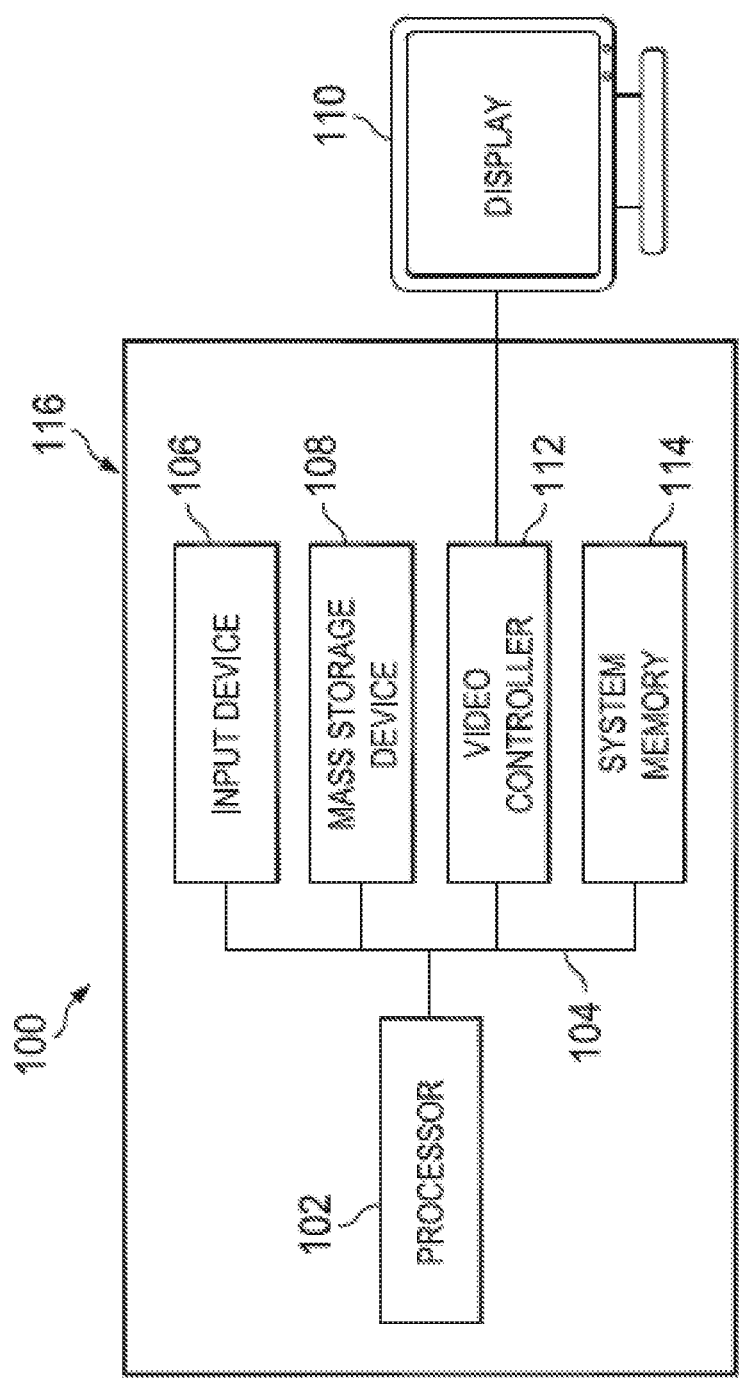
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
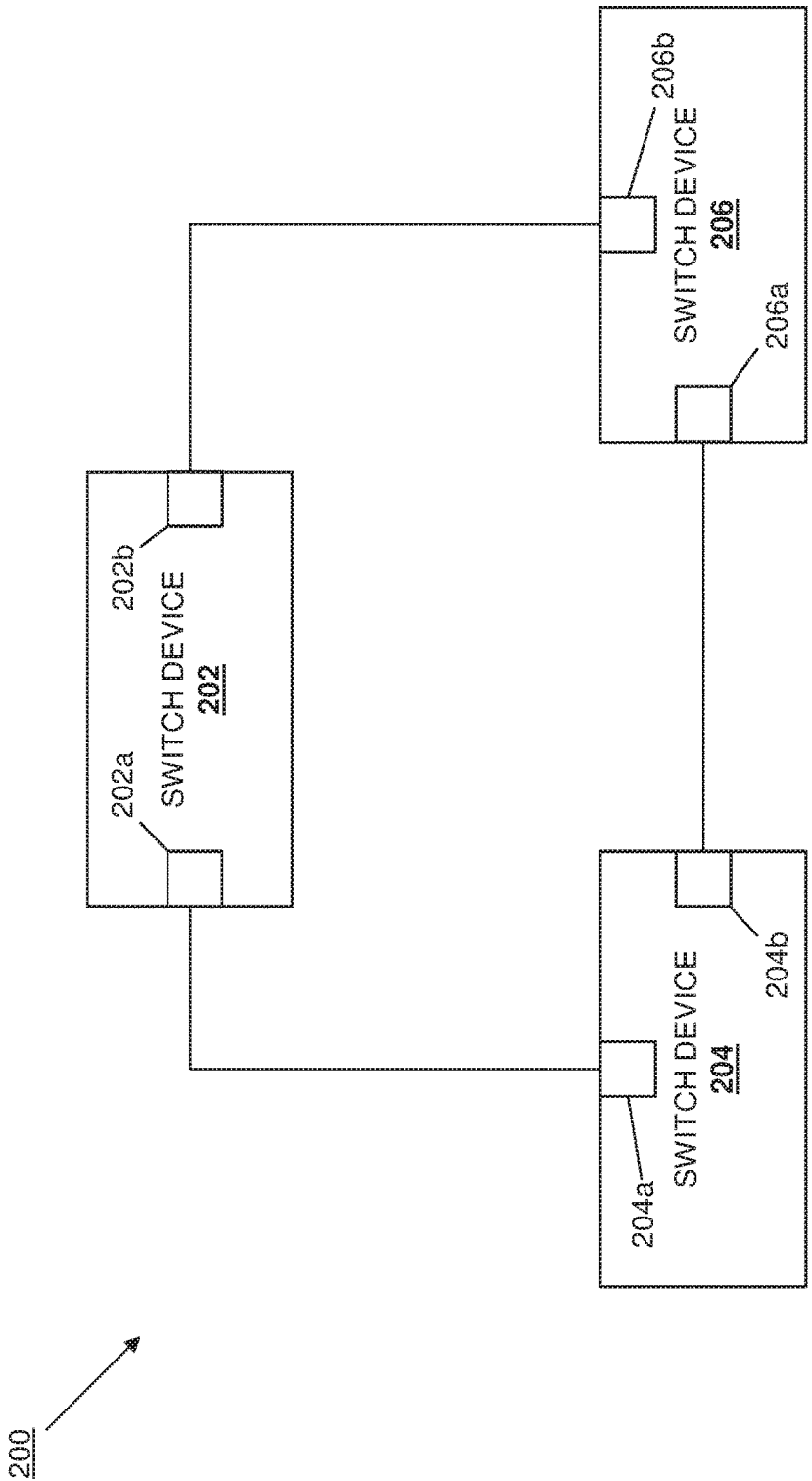
FIG. 2 is a schematic view illustrating an embodiment of a network of switch devices.

Referring now to FIG. 2, an embodiment of a network 200 of switch devices is illustrated, the operation of which is described in some of the examples discussed below. The network 200 includes a plurality of switch devices 202, 204, and 206, any or all of which may be provided by the IHS 100 discussed above with reference to FIG. 1, and/or include some or all of the components of the IHS 100. In the illustrated embodiment, the switch device 202 includes a port 202*a* that is linked to a port 204*a* on the switch device 204 (e.g., via an Ethernet cable), and a port 202*b* that is linked to a port 206*b* on the switch device 206 (e.g., via an Ethernet cable). Furthermore, the switch device 204 includes a port 204*b* that is linked to a port 206*a* on the switch device 206 (e.g., via an Ethernet cable).

Figure 3:
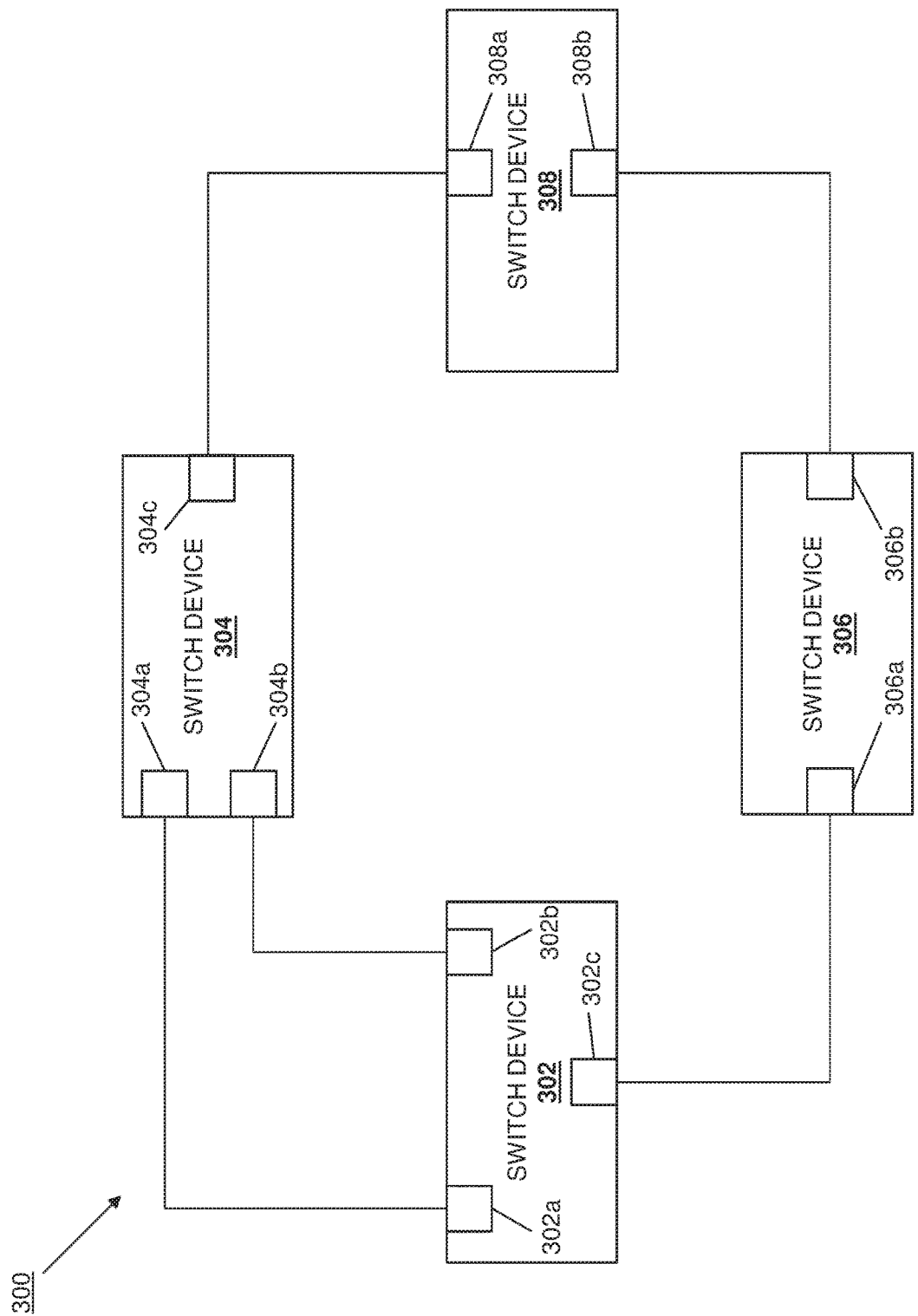
FIG. 3 is a schematic view illustrating an embodiment of a network of switch devices.

Referring now to FIG. 3, an embodiment of a network 300 of switch devices is illustrated, the operation of which is described in some of the examples discussed below. The network 300 includes a plurality of switch devices 302, 304, 306, and 308, any or all of which may be provided by the IHS 100 discussed above with reference to FIG. 1, and/or include some or all of the components of the IHS 100. In the illustrated embodiment, the switch device 302 includes ports 302*a* and 302*b* that are linked to ports 304*a* and 304*b*, respectively, on the switch device 304 (e.g., via Ethernet cables), and a port 302*c* that is linked to a port 306*a* on the switch device 306 (e.g., via an Ethernet cable). Furthermore, the switch device 304 includes a port 304*c* that is linked to a port 308*a* on the switch device 308 (e.g., via an Ethernet cable). Further still, the switch device 306 includes a port 306*b* that is linked to a port 308*b* on the switch device 308 (e.g., via an Ethernet cable).

Figure 4:
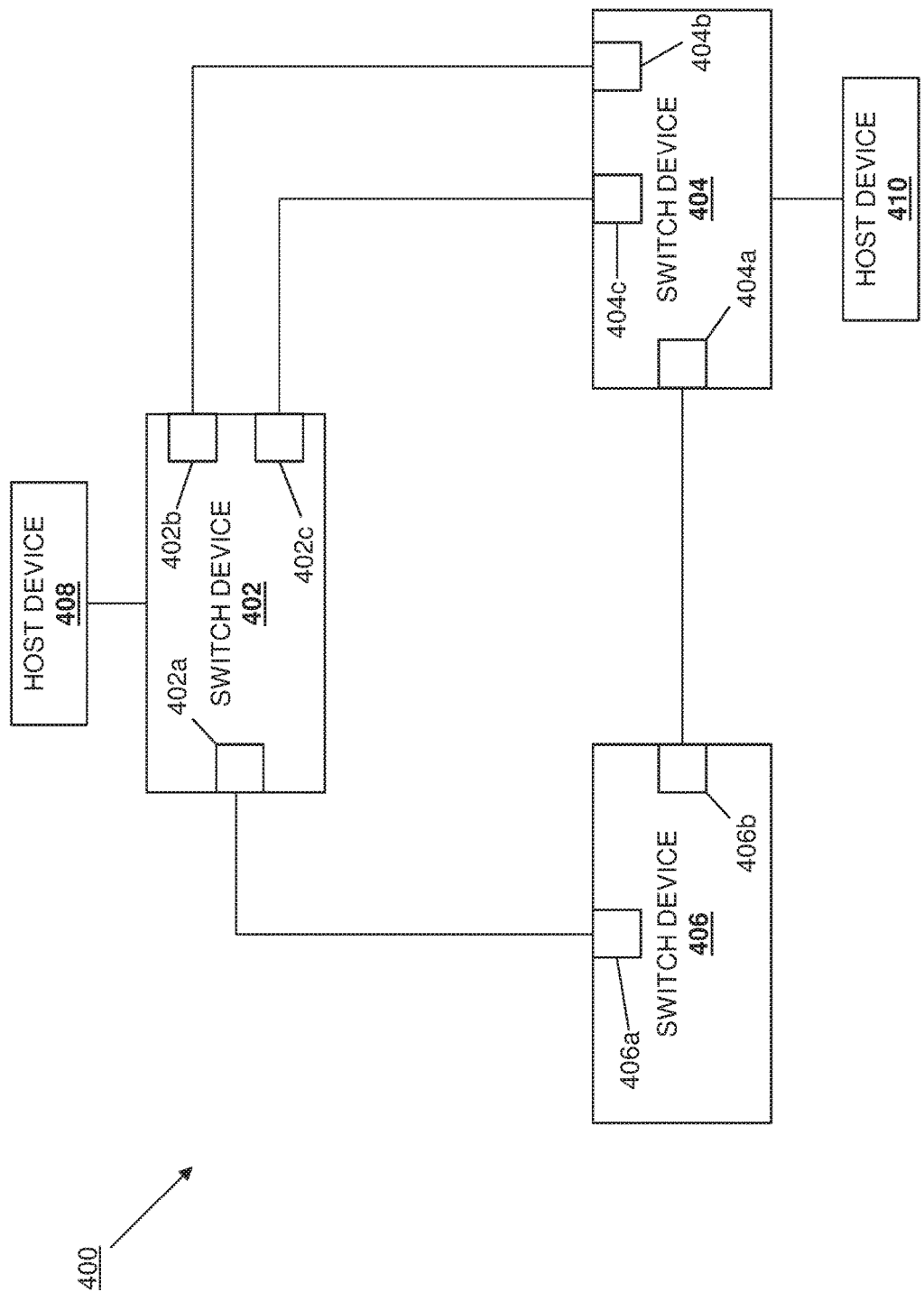
FIG. 4 is a schematic view illustrating an embodiment of a network of switch devices.

Referring now to FIG. 4, an embodiment of a network 400 of switch devices is illustrated, the operation of which is described in some of the examples discussed below. The network 400 includes a plurality of switch devices 402, 404, and 406, any or all of which may be provided by the IHS 100 discussed above with reference to FIG. 1, and/or include some or all of the components of the IHS 100. In the illustrated embodiment, the switch device 402 is coupled to a host device 408, and includes a port 402*a* that is linked to a port 406*a* on the switch device 406 (e.g., via an Ethernet cable), and ports 402*b* and 402*c* that are linked to ports 404*b* and 404*c*, respectively, on the switch device 404 (e.g., via Ethernet cables). Furthermore, the switch device 406 includes a port 406*b* that is linked to a port 404*a* on the switch device 404 (e.g., via an Ethernet cable). Further still, the switch device 404 is coupled to a host device 410.

In the examples discussed below involving the networks 200, 300, and 400, each of the ports on the switch devices may be configured with a port role that is indicated in the FIGS. 2, 3, and 4 by a letter provided in that port. As such, in the examples below, the letter "D" is provided in a port to indicate a designated port role, the letter "A" is provided in a port to indicate an alternate port role, and the letter "R" is provided in a port to indicate a root port role. However, one of skill in the art in possession of the present disclosure will recognize that ports may include other port roles and/or port states while remaining within the scope of the present disclosure.

Figure 5:
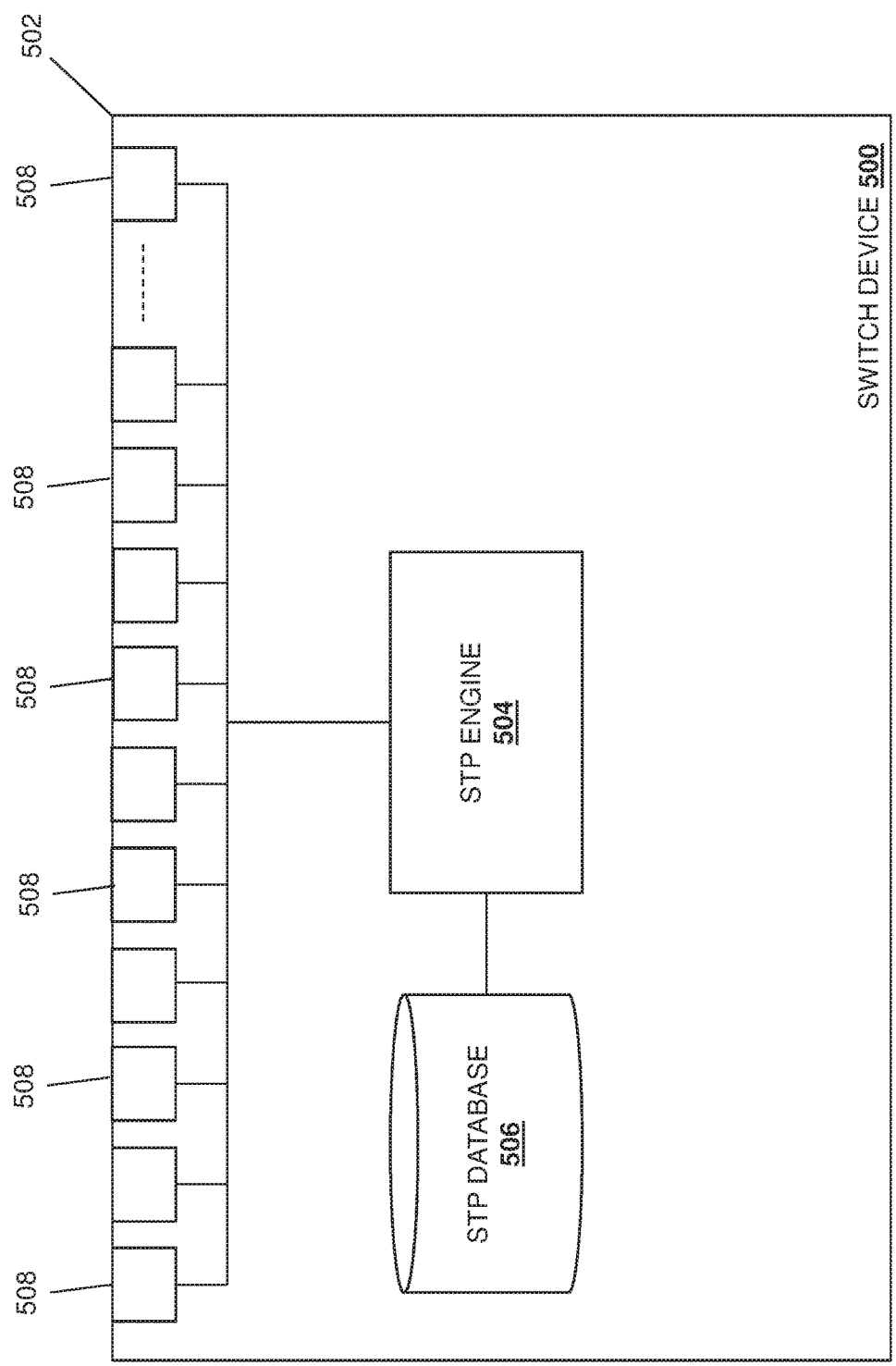
FIG. 5 is a schematic view illustrating an embodiment of a switch device that may be any of the switch devices in the networks of FIG. 2, 3, or 4.

Referring now to FIG. 5, an embodiment of a switch device 500 is illustrated that may be any of the switch devices included in the networks 200, 300, and 400 discussed above. As such, the switch device 500 may be provided by the IHS 100 discussed above with reference to FIG. 1, and/or may include some or all of the components of the IHS 100. In the illustrated embodiment, the switch device 500 includes a chassis 502 that houses the components of the switch device 500, only some of which are illustrated in FIG. 5. For example, the chassis 502 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a spanning tree protocol engine 504 that is configured to perform the functions of the spanning tree protocol engines and switch devices discussed below. In a specific example, the spanning tree protocol engine 504 may include hardware and/or software such as the control plane software that undergoes the warm reboot processes discusses below. However, other switch device components that undergo warm reboot processes may benefit from the teachings of the present disclosure and thus are envisioned as falling within the scope of the present disclosure as well. In the examples discussed below, the spanning tree protocol engine 504 is configured to provide one or more of the rapid spanning tree protocol (RSTP), the multiple spanning tree protocol (MSTP), and the rapid per-Virtual Local Area Network (VLAN) spanning tree protocol (RPVSTP), although other versions of the spanning tree protocol are envisions as falling within the scope of the present disclosure as well.

The chassis 502 may also house a storage system (not illustrated, but which may include the storage device 108 discussed above with reference to FIG. 1) that includes a spanning tree protocol database 506 that is coupled to the spanning tree protocol engine 504 (e.g., via a coupling between the storage system and the processing system) and that may store any of the information used to provide the functionality discussed below. In the embodiments discussed below, the spanning tree protocol database 506 is a persistent database that is configured to store information across reboots of the switch device 500 (e.g., cold reboots and/or warm reboots), but in different embodiments the spanning tree protocol database 506 may include combinations of persistent and non-persistent databases while remaining within the scope of the present disclosure. The chassis 502 may also house a communication system that is coupled to the spanning tree protocol engine 504 (e.g., via a coupling between the communication system and the processing system) and that includes a plurality of ports 508, any of which may provide the ports on the switch devices discussed below. While a specific switch device has been illustrated and described, one of skill in the art in possession of the present disclosure will recognize that switch devices may include a variety of different components and/or component configurations that provide for conventional switch device functionality, as well as the functionality discussed below, while remaining within the scope of the present disclosure.

Figure 6:
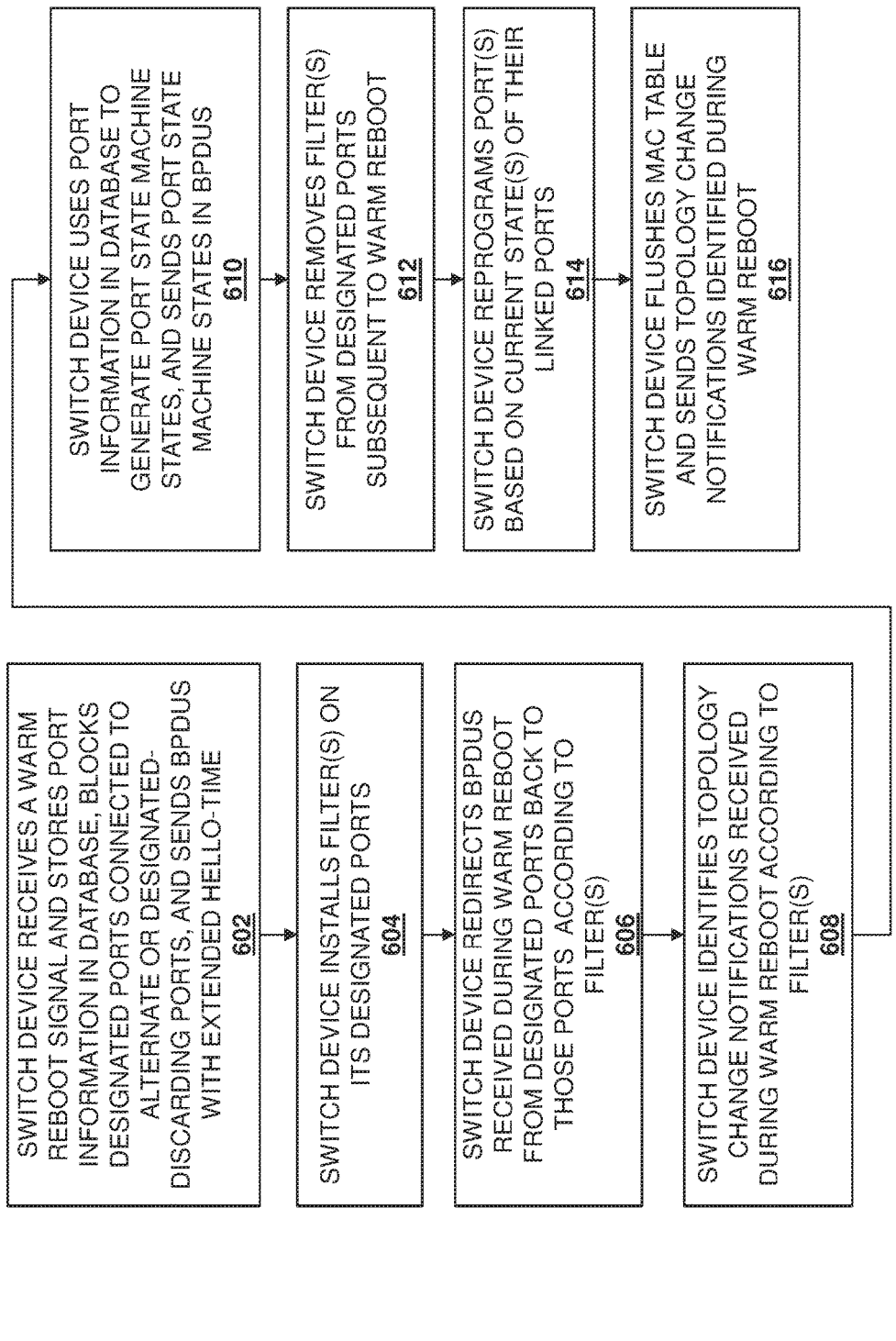
FIG. 6 is a flow chart illustrating an embodiment of a method of providing spanning tree protocol warm reboots.

Referring now to FIG. 6, an embodiment of a method 600 for providing spanning tree protocol warm reboots is illustrated. As discussed below, the systems and methods of the present disclosure provide for warm reboots in switch devices in networked systems that use the spanning tree protocol without leading to traffic loops or other traffic disturbances. This is enabled, at least in part, by having the switch device store (in a persistent database and prior to performing a warm reboot process) operational parameters of the spanning tree protocol state machine variables and peer port roles/states of designated ports. The switch device may also block its designated ports that are connected to peer ports (i.e., on other switch devices in the network) that are alternate-discarding ports or designated-discarding ports, and send Bridge Protocol Data Units (BPDUs) with an extended hello-time. The switch devices then installs Access Control Lists (ACLs)/filters on each of its designated ports that cause spanning tree BPDUs that are received during the warm reboot process from ports on other switch devices with a peer role of "designated" to be sent back to those switch devices, and that count the number of topology change notifications received at its ports during the warm reboot process. Subsequent to the warm reboot, the switch device then operates to use the operational parameters stored in the persistent database to construct the state machines and send BPDUs with that information on all of its ports, remove the ACLs/filters, and reprogram its ports based on the current port states in the network, which prevents traffic loops that may otherwise occur. The switch device may also determine the ports that received topology change notifications during the warm reboot process and, in response, flush its Media Access Control (MAC) table and send topology change notifications on all forwarding ports, which prevents traffic disturbances such as traffic "black holes" that would otherwise occur.

The method 600 begins at block 602 where a switch device receives a warm reboot signal and, in response, stores port information in a database, blocks designated ports that are connected to alternate or designated-discarding ports, and sends BPDUs with extended hello-times. In an embodiment, at or before block 602, the spanning tree protocol engine 504 in the switch device 500 (which may be any of the switch devices in the networks 200, 300, and 400 discussed below) may have been previously initialized (e.g., with the switch device hardware in response to a cold reboot, in response a previous warm reboot, etc.) and, at block 602, may receive a warm reboot signal. For example, a warm reboot signal may be generated at block 602 in response to a user or network administrator input (e.g., via a Control Line Interface (CLI) or management Graphical User Interface (GUI) provided on a management device (not illustrated) communicating with the switch device 500), in response to the operation of other software or hardware in the switch device 500, and/or in a variety of other warm reboot scenarios that would be apparent to one of skill in the art in possession of the present disclosure. In a specific example, at block 602, control plane software provided by the spanning tree protocol engine 504 receives a warm restart reboot signal that is configured to produce a restart, reboot, or re-initialization of that control plane software while the switch device 500 is powered (e.g., the hardware in the switch device is receiving power from a power source) and running.

In an embodiment, in response to receiving the warm reboot signal at block 602, the spanning tree protocol engine 504 may operate to store port information in the spanning tree protocol database 506 (e.g., a persistent database provided by the spanning tree protocol database 506 in these embodiments.) For example, at block 602, the spanning tree protocol engine 504 may store operational parameters of the spanning tree protocol state machine variables in the spanning tree protocol database 506 such as variables or other parameters that are identified for High Availability, and/or a variety of other data that would be apparent to one of skill in the art as enabling the functionality discussed below. In addition, at block 602, the spanning tree protocol engine 504 may also store peer port roles and/or peer port states (i.e., ports roles/states of linked ports on other switch devices) for any ports 508 on the switch device 500 that are assigned a designated port role.

In an embodiment, in response to receiving the warm reboot signal at block 602, the spanning tree protocol engine 504 may also operate to block its ports 508 that are assigned a designated port state and that are connected to peer ports (i.e., linked ports on other switch devices) that are assigned an alternate port role or to designated-discarding ports. In an embodiment, in response to receiving the warm reboot signal at block 602, the spanning tree protocol engine 504 may also operate to send BPDUs with an extended hello-time. As would be understood by one of skill in the art in possession of the present disclosure, the spanning tree protocol engine 504 may send BPDUs in preparation for a warm reboot and, at block 602, the BPDUs may include a hello-time that is extended relative to conventional BPDU hello-times that can be between 1-10 seconds, and that typically are set at 2 seconds. In the embodiments provided below, the BPDU hello-time is set at 90 seconds to ensure completion of the warm reboot of the control plane software in the switch device, and in specific examples may be set to at least 30 seconds. However, one of skill in the art in possession of the present disclosure will recognize that other extended BPDU hello-times may be utilized that are less than 30 seconds or more than 90 seconds as long as those extended BPDU hello-times will allow for completion of the warm reboot process discussed below without the peer ports (ports assigned a root port role or an alternate port role) aging out the root information received from the switch device that is undergoing the warm reboot process. While a few examples of port information that may be stored at block 602 in response to a warm reboot signal has been provided, one of skill in the art in possession of the present disclosure will recognize that other information and/or data may be stored in preparation for a warm reboot while remaining within the scope of the present disclosure.

The method 600 then proceeds to block 604 where the switch device installs filters on its designated ports. In an embodiment, at block 604 and in response to receiving the warm reboot signal at block 602, the spanning tree protocol engine 504 may operate to install Access Control Lists (ACLs) and/or other filtering mechanisms that are configured to perform the filter functionality discussed below. For example, at block 604 the spanning tree protocol engine 504 may install, on each of the ports 508 on the switch device 500 that are assigned a designated port role, an ACL that is configured to redirect received BPDUs back to the port that sent them (e.g., back to the peer port linked to the designated port that received that BPDU.) In a specific example, such an ACL may include qualifiers that may be provided in a port bitmap of ingress ports that are assigned a designated port role, and that may include an instance/VLAN identifier that will be present in such BPDUs, a port role value that will be present in such BPDUs (i.e., "designated"), and/or other data, along with an action to redirect the BPDUs back to the source port. However, one of skill in the art in possession of the present disclosure will recognize that ACLs may include a variety of other information to provide similar functionality while remaining within the scope of the present disclosure. Furthermore, one of skill in the art in possession of the present disclosure will recognize that only a single ACL may be required to perform this functionality in the case of RSTP, while MSTP and RPVSTP may require a number of ACLs equal to the number of MSTP/RPVSTP instances in order to perform this functionality.

In another example, at block 604, the spanning tree protocol engine 504 may also install, for each instance of the spanning tree protocol, an ACL that is configured to count the number of topology change notifications that were received for that spanning tree protocol instance during the warm reboot process. In a specific example, such an ACL may include qualifiers that may be provided in a port bitmap of spanning-tree-protocol-enabled ports, and that may include an instance/VLAN identifier that will be present in such BPDUs, a topology change bit that will be present in such BPDUs, and/or other data, along with an action to increment a counter when such BPDUs are received. However, one of skill in the art in possession of the present disclosure will recognize that ACLs may include a variety of other information to provide similar functionality while remaining within the scope of the present disclosure. As discussed below, the counting of topology change notifications received during a warm reboot process allows for the sending of topology change notifications subsequent to the warm reboot process, which provides for the clearing of any traffic "black holes" that may have be produced in the network as a result of the warm reboot process. While a few examples of filters that may be provided on port(s) at block 604 in response to a warm reboot signal have been provided, one of skill in the art in possession of the present disclosure will recognize that other filters may be provided on ports on a switch device in preparation for a warm reboot while remaining within the scope of the present disclosure.

The method 600 then proceeds to block 606 where the switch device redirects BPDUs received during warm reboot from designated ports back to those ports according to the filters. In an embodiment, at or before block 606, the spanning tree protocol engine 504 begins the warm reboot process. For example, the control plane software provided by the spanning tree protocol engine 504 may begin the warm reboot process. As discussed above, during the warm reboot process, BPDUs received from designated ports will be redirected back to those ports according to the ACL/filter installed on those ports. The redirection of BPDUs back to their source at block 606 is described further with reference to the examples discussed with regard to FIGS. 7A-7D, 8A-8G, and 9A-9D, below.

The method 600 then proceeds to block 608 where the switch device identifies topology change notifications received during warm reboot according to the filters. In an embodiment, at block 608 and during the warm reboot process, each topology change notification (e.g., provided in BPDUs) received at a spanning-tree-protocol-enabled port on the switch device 500 will cause a counter to be incremented as per the ACL/filter provided on that port. The receipt of topology change notifications and the incrementing of counters in response at block 608 is described further with reference to the examples discussed with regard to FIGS. 7A-7D, 8A-8G, and 9A-9D, below.

The method 600 then proceeds to block 610 where the switch device uses the port information stored in the database to generate port state machine states, and sends the port state machines states in BPDUs. In an embodiment, at block 610, the spanning tree protocol engine 504 may retrieve the port information stored in the spanning tree protocol database 506 at block 602, and use that port information to generate port state machine states that may be sent in BPDUs. For example, at block 610 the spanning tree protocol engine 504 may retrieve the operational parameters of the spanning tree protocol state machine variables stored in the persistent database provided in the spanning tree protocol database 506 at block 602, and use any of a variety of High Availability mechanisms to generate the port state machine states using those operational parameters. The spanning tree protocol engine 504 may then create a BPDU that include this port state machine state information, and send that BPDU through its forwarding ports with a designated role (if any exist). The generation and sending of the port state machine state information at block 610 is described further with reference to the examples discussed with regard to FIGS. 7A-7D, 8A-8G, and 9A-9D, below.

The method 600 then proceeds to block 612 where the switch device removes the filters from its designated ports subsequent to the warm reboot. In an embodiment, at or before block 612, the spanning tree protocol engine 504 completes the warm reboot process. For example the control plane software provided by the spanning tree protocol engine 504 may complete the warm reboot process such that it is prepared for runtime operation. In some embodiments, at block 612, the spanning tree protocol engine 514 may operate to remove the ACL(s)/filter(s) from its designated ports that were configured to redirect BPDUs back to their source ports. In some embodiments, at block 612, the spanning tree protocol engine 514 may operate to remove the ACL(s)/filter(s) from its spanning-tree-protocol-enabled ports that are configured to provide for the counting of topology change notifications received at those ports. The removal of filters block 612 is described further with reference to the examples discussed with regard to FIGS. 7A-7D, 8A-8G, and 9A-9D, below.

The method 600 then proceeds to block 614 where the switch device reprograms port(s) based on the current role(s)/state(s) of their linked ports. In an embodiment, at block 614, the spanning tree protocol engine 504 may operate to reprogram one or more of its ports based on the current port states of their linked ports. The reprogramming of ports based on the port role/state of their linked ports at block 614 is described further with reference to the examples discussed with regard to FIGS. 7A-7D, 8A-8G, and 9A-9D, below.

The method 600 then proceeds to block 616 where the switch device may flush its MAC table and sends topology change notifications identified during the warm reboot. In an embodiment, at block 616, the spanning tree protocol engine 504 may operate to determine spanning tree protocol instances on its ports 508 that include a counter with a non-zero number (i.e., ports that received at least one topology change notification during the warm reboot process and, as a result, had their counter incremented according to the ACL/filter provided on that port) and, for each of those spanning tree protocol instances, flush the MAC table associated with that spanning tree protocol instance, and send a topology change notification on all of its forwarding ports that have a root or designated role (and thus are in a forwarding state) The flushing of MAC tables and sending of topology change notifications at block 616 provides for the clearing of traffic "black holes" in the network that exist subsequent to the warm reboot process, and is described further with reference to the examples discussed with regard to FIGS. 7A-7D, 8A-8G, and 9A-9D, below.

Figure 7A:
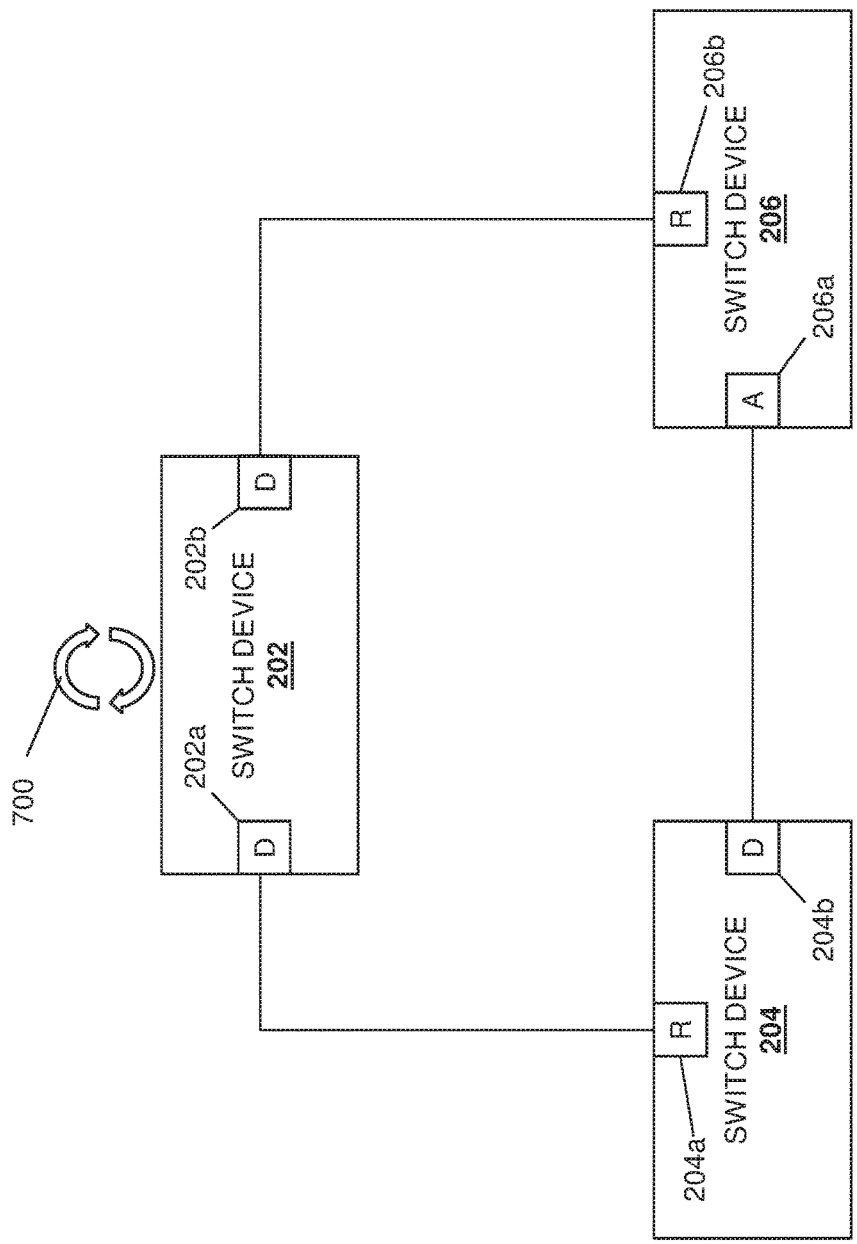
FIG. 7A is a schematic view illustrating the provisioning of a warm reboot in one of the switch devices in the network of FIG. 2.

Referring first to FIGS. 7A-7D, an example is provided of the switch device 202 in the network 200 that is initially acting as a root bridge and that performs the method 600 described above. While the switch device 202 is not explicitly described below as performing each block of the method 600, one of skill in the art in possession of the present disclosure will recognize that any of the blocks of the method 600 may be performed by the switch device 202 in order to enable the functionality detailed below. Referring initially to FIG. 7A, prior to the warm reboot of the switch device 202, the switch device 202 is assigned a priority of "8192", the switch device 204 is assigned a priority of "32768", and the switch device 206 is assigned a priority of "36864". Thus, the switch device 202 is operating as a root bridge and, as can be seen in the FIG. 7A, the switch device 202 includes the ports 202a and 202b assigned designated port roles, the switch device 204 includes the port 204a assigned a root port role and the port 204b assigned a designated port role, and the switch device 206 includes the port 206a assigned an alternate port role and the port 206b assigned a root port role. As discussed above with regard to block 602 of the method 600, upon receiving a warm reboot signal that begins a warm reboot process 700 in the switch device 202, the switch device 202 may store spanning tree protocol operational information and peer port role and state information for each of its ports 202a and 202b that are assigned the designated port role. As also discussed above with regard to block 602 of the method 600, upon receiving a warm reboot signal that begins the warm reboot process 700 in the switch device 202, the switch device 202 may send a BPDU with an extended hello-time (at least 30 seconds, and 90 seconds in this example) on its ports 202a and 202b that are assigned the designated port role.

As also discussed above with regard to block 604 of the method 600, upon receiving a warm reboot signal that begins the warm reboot process 700 in the switch device 202, the switch device 202 may install ingress filters that are configured to cause BPDUs, which are received at the ports 202a and 202b that are assigned the designated port role and that include a peer port role of designated, to be redirected back to the port that sent that BPDU. With reference to FIG. 7B, in response to the switch device 202 beginning the warm reboot process 700, the switch device 206 may be reassigned a priority of "4096" such that it becomes the root bridge and, as a result, the ports 206a and 206b on the switch device 206 may be reassigned designated port roles, with the port 204a on the switch device 204 reassigned a designated port role, and the port 204b on the switch device 204 reassigned a root port role. As would be understood by one of skill in the art and as illustrated in FIG. 7B, the assignment of a designated port role to each of the linked ports 202a/204a will cause the port 204a on the switch device 204 to enter a blocking mode 702, and the assignment of a designated port role to each of the linked ports 202b/206b will cause the port 206b on the switch device 206 to enter a blocking mode 704.

Figure 7C:
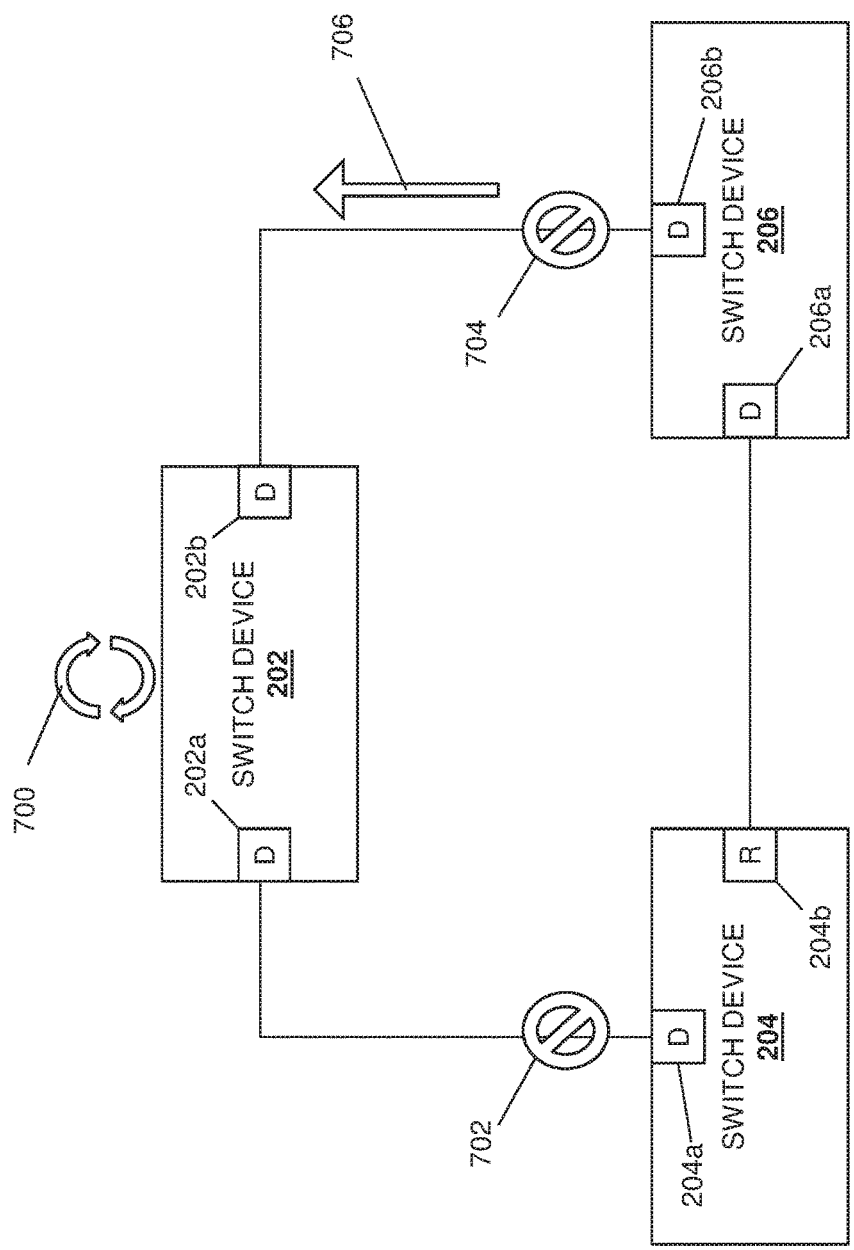
FIG. 7C is a schematic view illustrating the provisioning of a warm reboot in one of the switch devices in the network of FIG. 2.
Figure 7D:
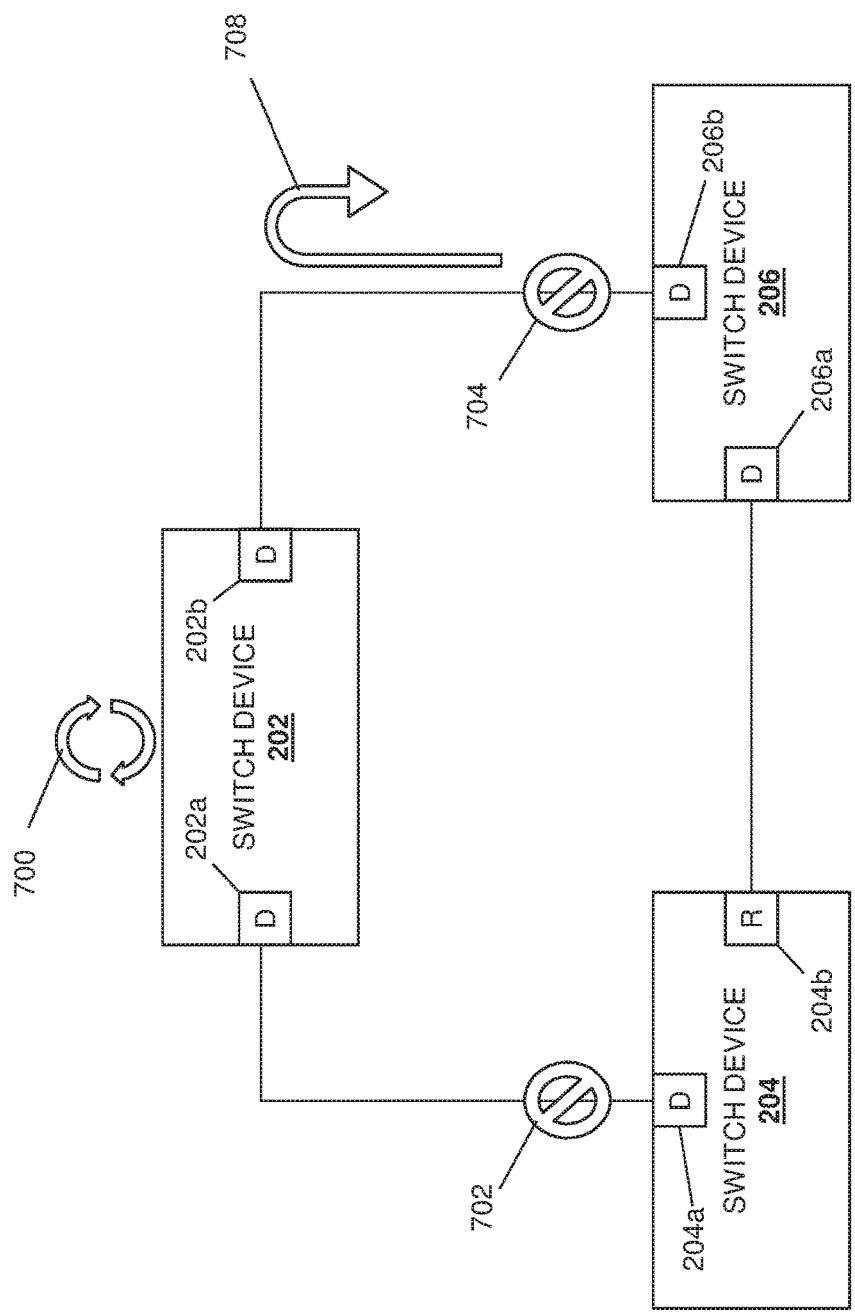
FIG. 7D is a schematic view illustrating the provisioning of a warm reboot in one of the switch devices in the network of FIG. 2.

With reference to FIGS. 7C and 7D, the switch device 206 then operates to send a proposal BPDU 706 through the port 206b to the port 202b on the switch device 202, and as would be understood by one of skill in the art in possession of the present disclosure, such a proposal BPDU 706 would indicate a designated port role for the port 206a. As discussed above with regard to block 606 of the method 600, the ACL/filter provided on the port 202b will cause the proposal BPDU 706 to be redirected (as indicated by element 708 in FIG. 7D) back to the port 206b on the switch device 206 in response to that BPDU indicating a designated port role for the port 206a. As such, ports 204a and 206b will remain in the blocking modes 702 and 704, respectively, preventing loops in the network 200 during the warm reboot of the switch device 202 acting as the root bridge.

Figure 8A:
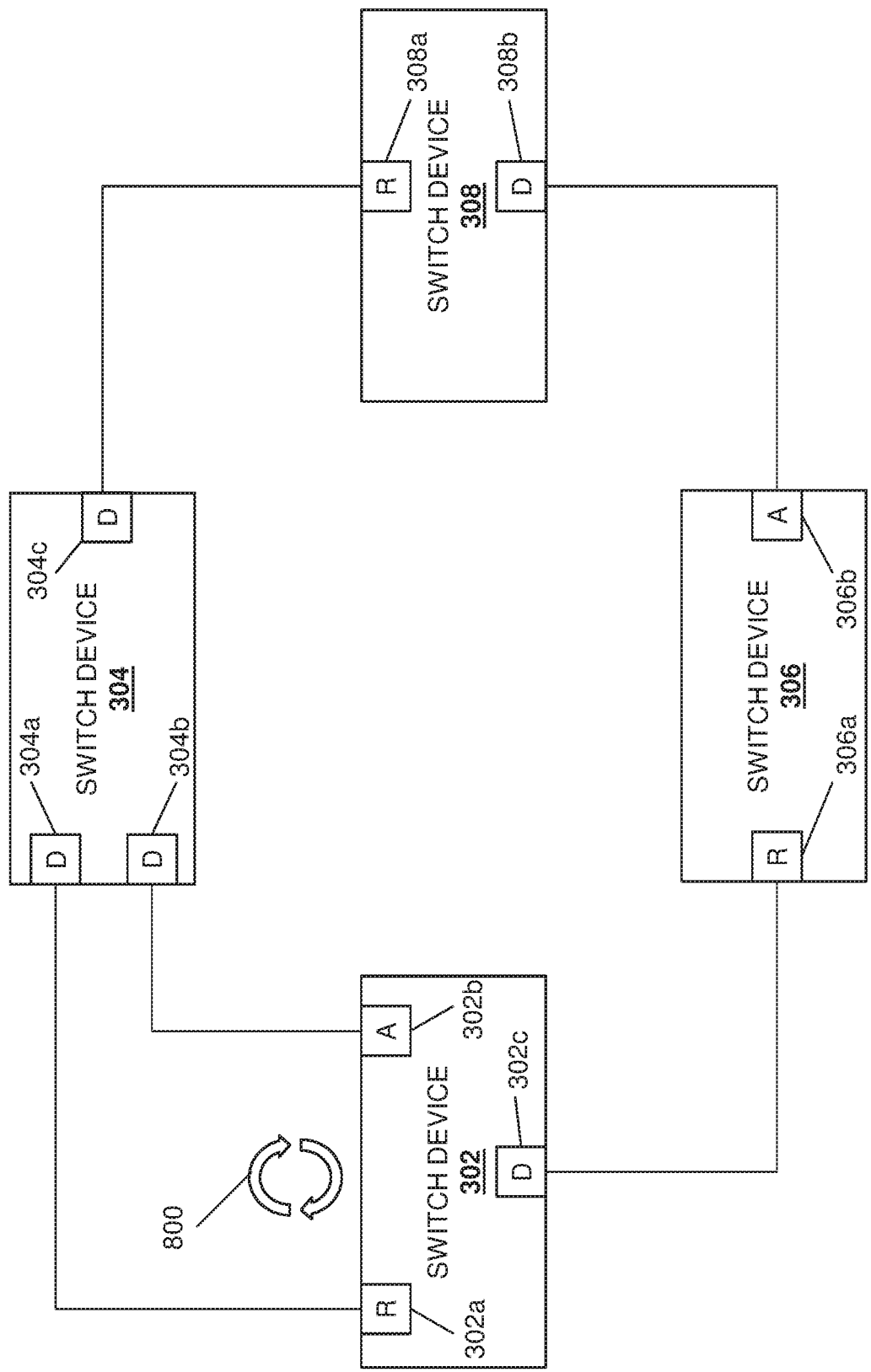
FIG. 8A is a schematic view illustrating the provisioning of a warm reboot in one of the switch devices in the network of FIG. 3.

Referring first to FIGS. 8A-8G, an example is provided of the switch device 302 in the network 200 that is acting as a non-root bridge and that performs the method 600 described above. While the switch device 302 is not explicitly described below as performing each block of the method 600, one of skill in the art in possession of the present disclosure will recognize that any of the blocks of the method 600 may be performed by the switch device 302 in order to enable the functionality detailed below. Referring initially to FIG. 8A, prior to the warm reboot of the switch device 302, the switch device 304 is assigned a priority of "4096", the switch device 302 is assigned a priority of "8192", the switch device 306 is assigned a priority of "16384", and the switch device 308 is assigned a priority of "32768. Thus, the switch device 304 is operating as a root bridge and, as can be seen in the FIG. 8A, the switch device 304 includes the ports 304a, 304b, and 304c assigned designated port roles; the switch device 302 includes the port 302a assigned a root port role, the port 302b assigned an alternate port role, and the port 302c assigned a designated port role; the switch device 306 includes the port 306a assigned a root port role and the port 306b assigned an alternate port role; and the switch device 308 includes the port 308a assigned a root port role and the port 308b assigned a designated port role. As discussed above with regard to block 602 of the method 600, upon receiving a warm reboot signal that begins a warm reboot process 800 in the switch device 302, the switch device 302 may store spanning tree protocol operational information, and peer port role and state information for its port 302c that is assigned the designated port role. As also discussed above with regard to block 602 of the method 600, upon receiving a warm reboot signal that begins the warm reboot process 800 in the switch device 304, the switch device 304 may send a BPDU with an extended hello-time (at least 30 seconds, and 90 seconds in this example) on its port 302c that is assigned the designated port role.

Figure 8B:
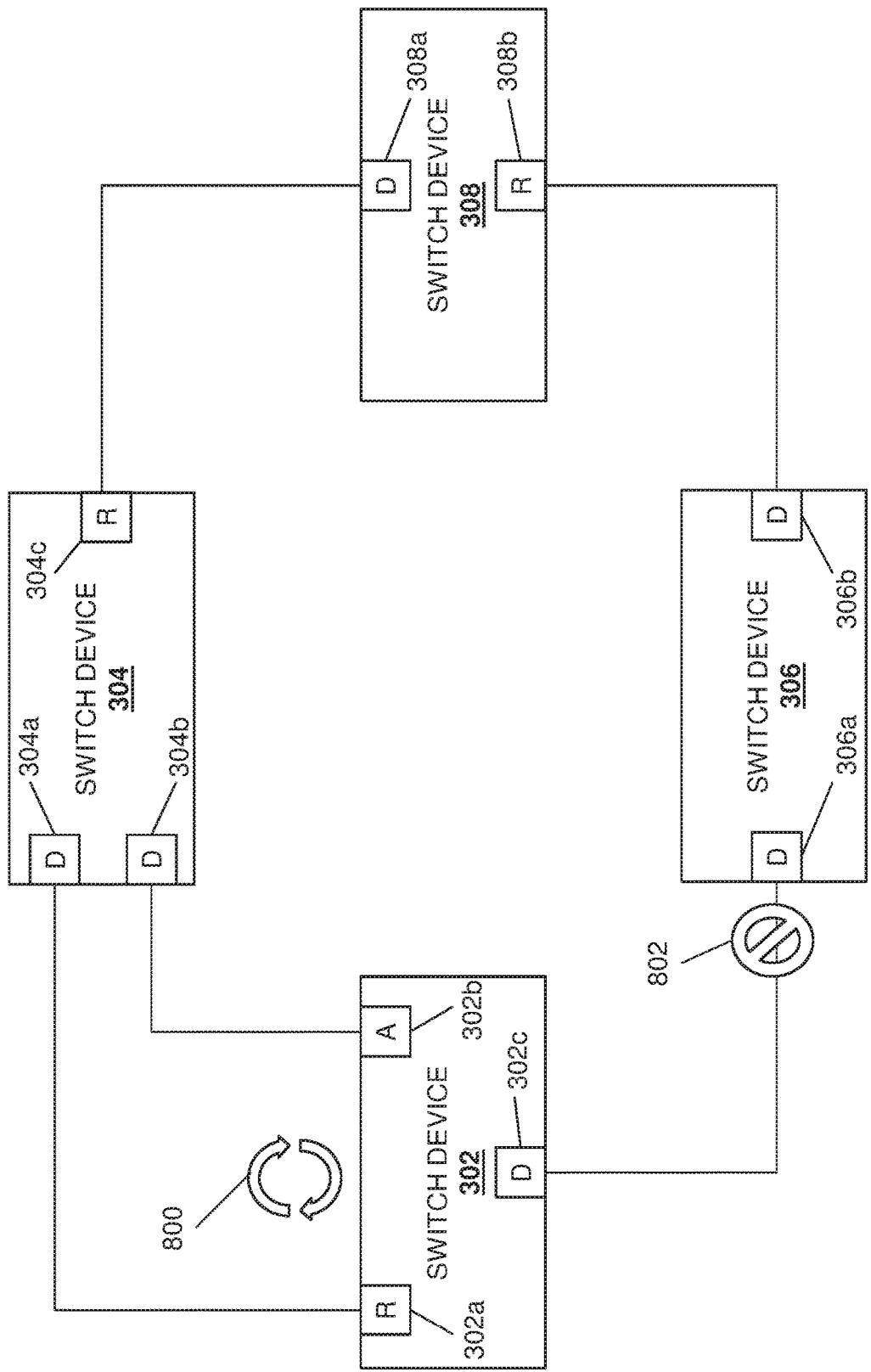
FIG. 8B is a schematic view illustrating the provisioning of a warm reboot in one of the switch devices in the network of FIG. 3.

As also discussed above with regard to block 604 of the method 600, upon receiving a warm reboot signal that begins the warm reboot process 800 in the switch device 302, the switch device 304 may install ingress filters that are configured to cause BPDUs, which are received at the port 302c that is assigned the designated port role and that include a peer port role of designated, to be redirected back to the port that sent that BPDU. As also discussed above with regard to block 604 of the method 600, upon receiving a warm reboot signal that begins the warm reboot process 800 in the switch device 302, the switch device 302 may install ingress filters that are configured to count topology change notifications received at the ports 302a, 302b, and 302c. With reference to FIG. 8B, in response to the switch device 302 beginning the warm reboot process 700, the switch device 306 may be reassigned a priority of "0" such that it becomes the root bridge and, as a result, the ports 306a and 306b on the switch device 306 may be reassigned designated port roles; with the port 308a on the switch device 308 reassigned a designated port role, and the port 308b on the switch device 308 reassigned a root port role; and with the port 304c on the switch device 304 reassigned a root port role. As would be understood by one of skill in the art and as illustrated in FIG. 8B, the assignment of a designated port role to each of the linked ports 306a/302c will cause the port 306a on the switch device 306 to enter a blocking mode 802.

Figure 8C:
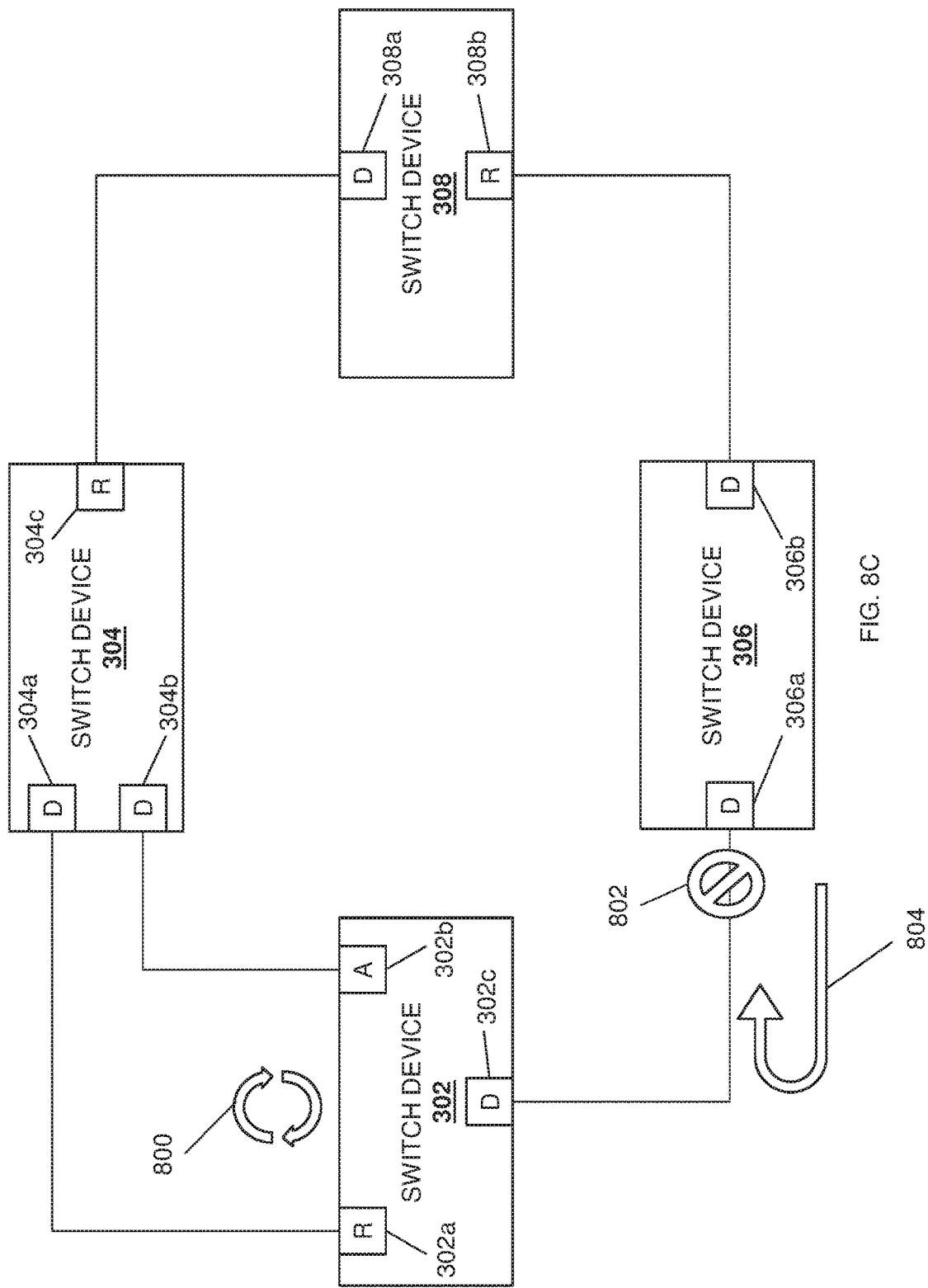
FIG. 8C is a schematic view illustrating the provisioning of a warm reboot in one of the switch devices in the network of FIG. 3.

With reference to FIG. 8C, the switch device 306 then operates to send a proposal BPDU through the port 306a to the port 302c on the switch device 302 and, as would be understood by one of skill in the art in possession of the present disclosure, such a proposal BPDU would indicate a designated port role for the port 306a. As discussed above with regard to block 606 of the method 600, the ACL/filter provided on the port 302c will cause the proposal BPDU to be redirected (as indicated by element 804 in FIG. 8C) back to the port 306a on the switch device 306 in response to that BPDU indicating a designated port role for the port 306a. As such, port 306a will remain in the blocking mode 802 as illustrated in FIG. 8D, preventing loops in the network 300 during and subsequent to the warm reboot process for the switch device 302.

Figure 8E:
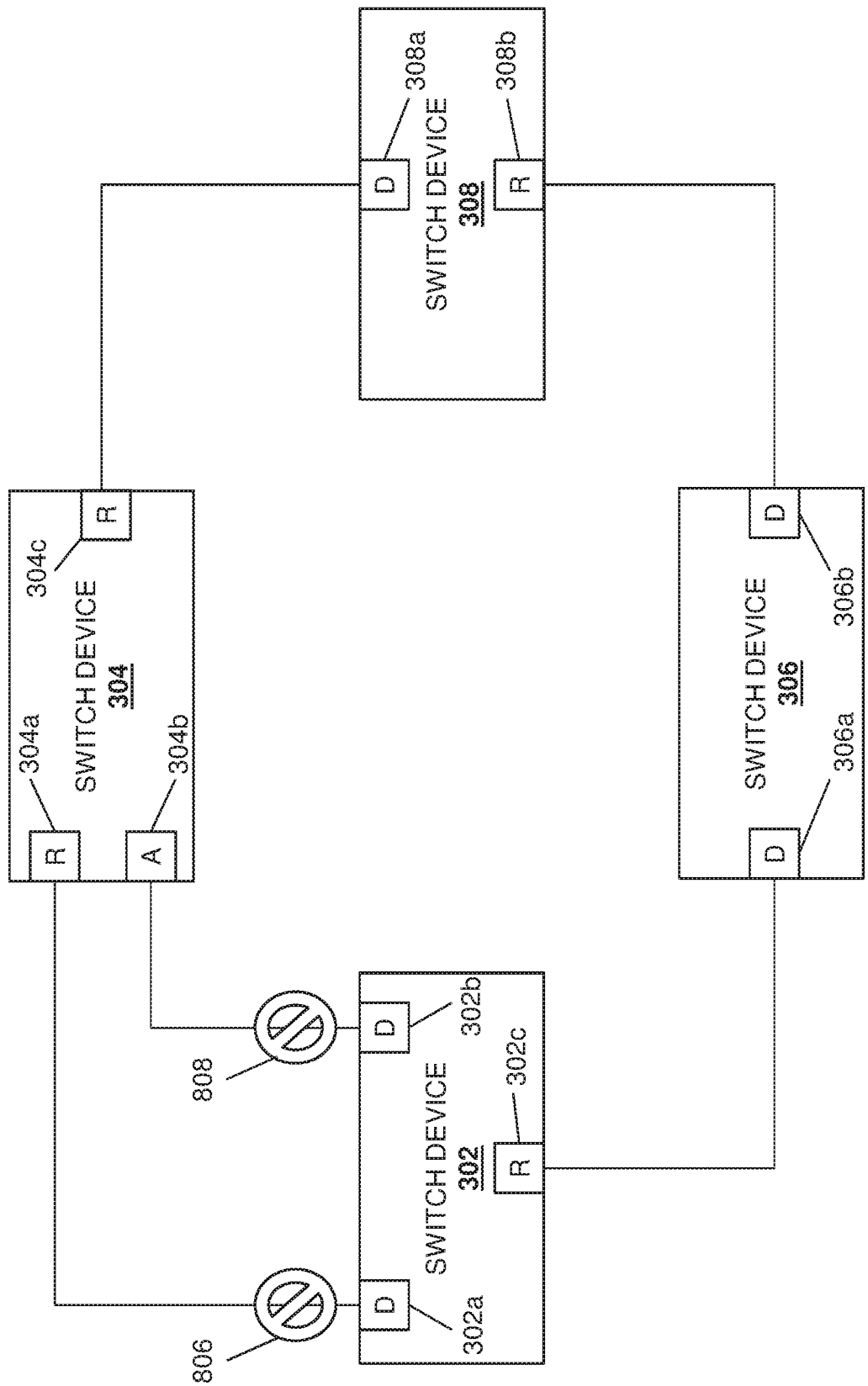
FIG. 8E is a schematic view illustrating the provisioning of a warm reboot in one of the switch devices in the network of FIG. 3.
Figure 8F:
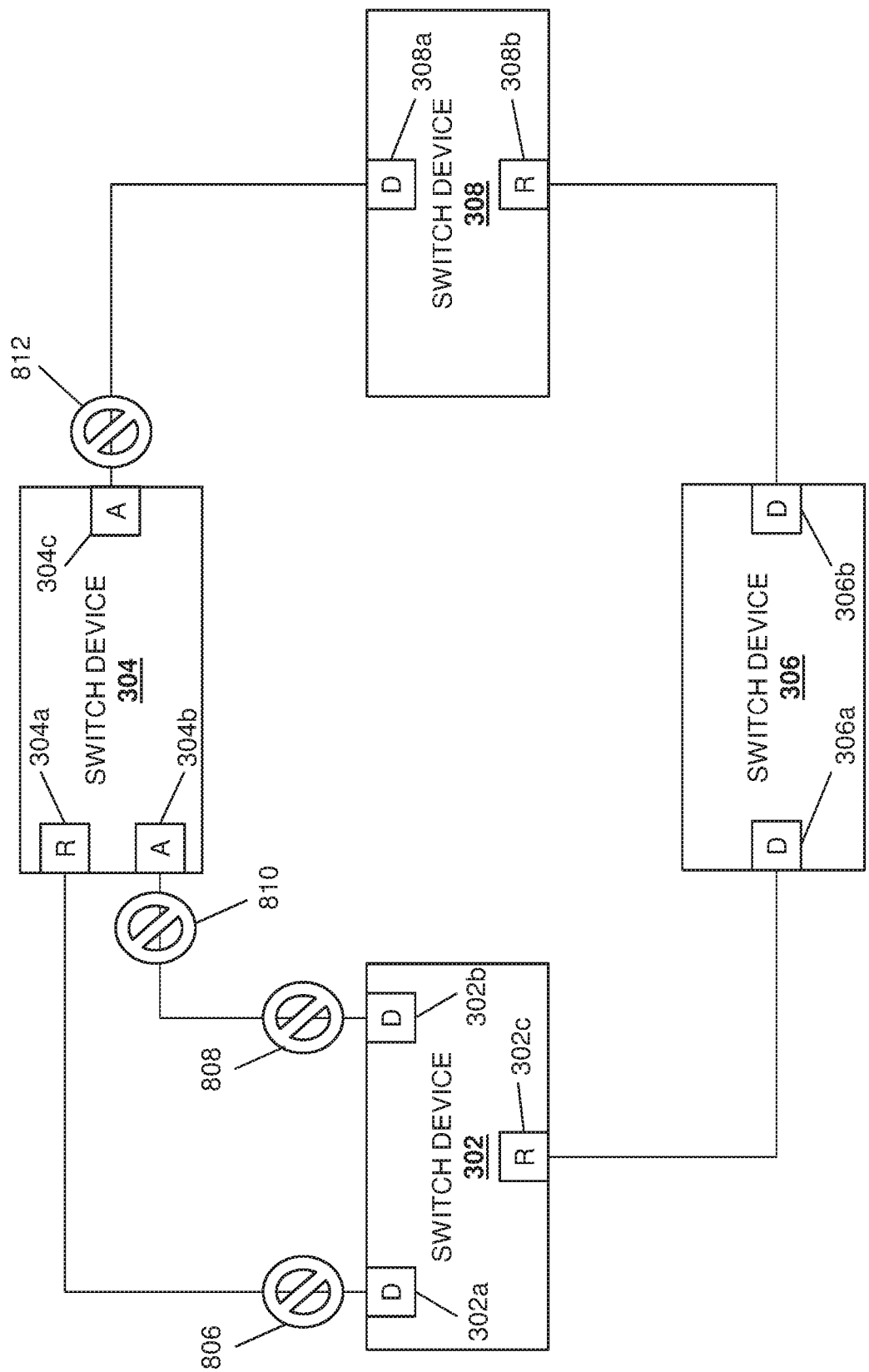
FIG. 8F is a schematic view illustrating the provisioning of a warm reboot in one of the switch devices in the network of FIG. 3.

As also illustrated in FIG. 8D, subsequent to the warm reboot process and as discussed with regard to block 614 of the method 600, the ports 302a and 302b on the switch device 302 may be reassigned designated port roles, and the port 302c on the switch device 302 may be reassigned a root port role. With reference to FIG. 8E, subsequent to the reassignment of the port roles of the ports 302a-c on the switch device 302 and as would be understood by one of skill in the art, the assignment of a designated port role to each of the linked ports 302a/304a will cause the port 302a on the switch device 302 to enter a blocking mode 806, and the assignment of a designated port role to each of the linked ports 302b/304b will cause the port 302b on the switch device 302 to enter a blocking mode 808. As illustrated in FIG. 8F, the reassignment of the port role of the port 302c to a root port role will cause the port 306a to exit the blocking mode 802. Furthermore, the reassignment of the port roles for the ports 302a and 302b to a designated port role will cause the switch device 304 to reassign the port 304a to a root port role, reassign the port 304b to an alternate port role that causes the port 304b to enter a blocking mode 810, and reassign the port 304c to an alternate port role that causes the port 304c to enter a blocking mode 812. As can be seen in FIG. 8G, the reassignment of the port role for the ports 302a and port 304a causes the port 302a to exit the blocking mode 806, and the reassignment of the port role for the ports 302b and port 304b causes the port 302b to exit the blocking mode 808, thus providing for the warm reboot of the non-root-bridge switch device 302 without creating a traffic loop.

Figure 9A:
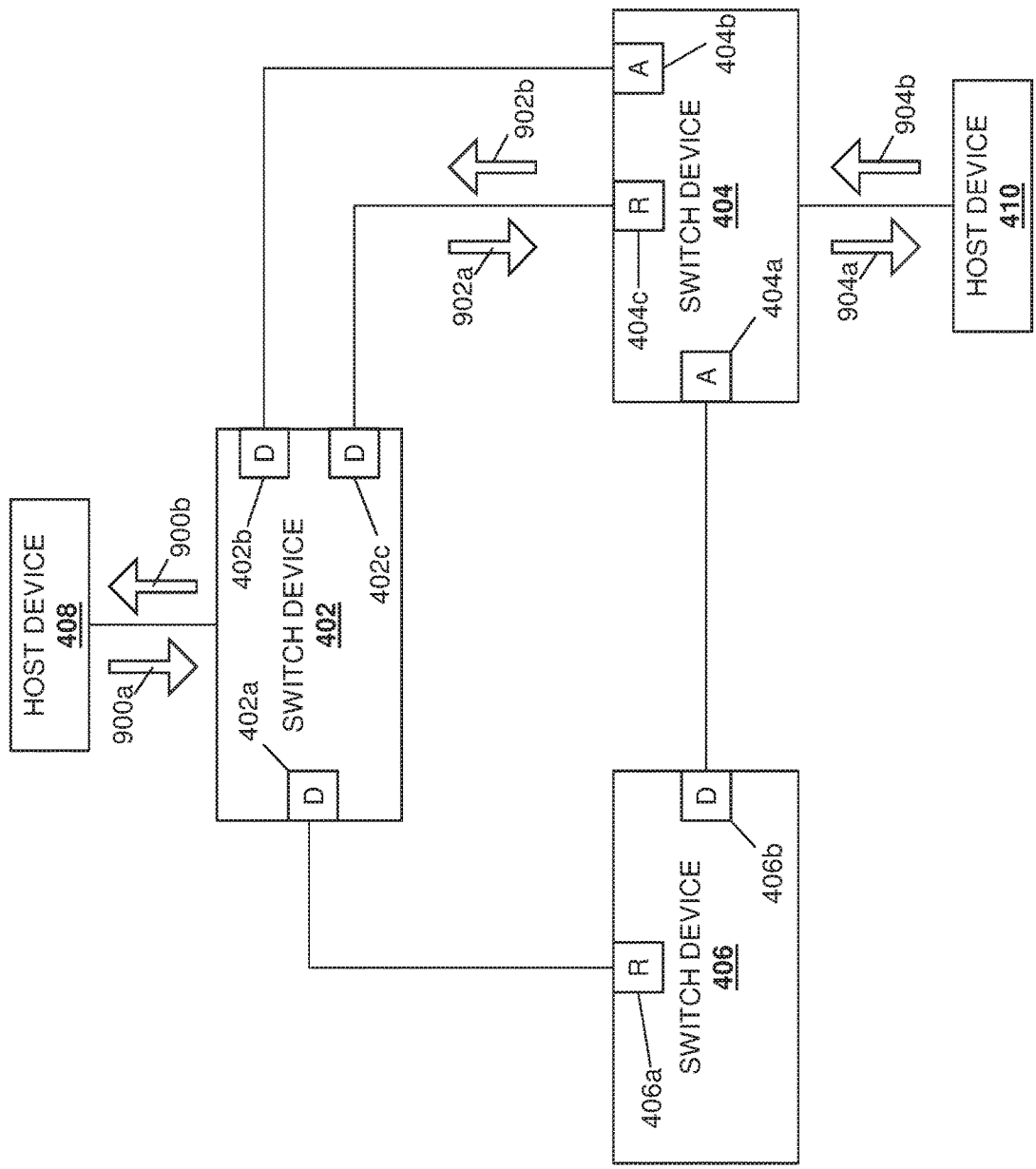
FIG. 9A is a schematic view illustrating the provisioning of a warm reboot in one of the switch devices in the network of FIG. 4.

Referring first to FIGS. 9A-9D, an example is provided of the switch device 402 in the network 400 that is acting as a root bridge and that performs the method 600 described above. While the switch device 402 is not explicitly described below as performing each block of the method 600, one of skill in the art in possession of the present disclosure will recognize that any of the blocks of the method 600 may be performed by the switch device 402 in order to enable the functionality detailed below. Referring initially to FIG. 9A, prior to the warm reboot of the switch device 402, the switch device 402 includes the ports 402a, 402b, and 402c assigned designated port roles; the switch device 404 includes the port 404b assigned an alternate port role, the port 404c assigned a root port role, and the port 404a assigned an alternate port role; and the switch device 406 includes the port 406a assigned a root port role and the port 406b assigned a designated port role. Furthermore, as can be seen in FIG. 9A, the host devices 408 and 410 may exchange communications via the switch device 402 and the switch device 404 (i.e., indicated by the arrows 900a/900b between the host device 408 and the switch device 402, the arrows 902a/902b between the switch device 402 and the switch device 404, and the arrows 904a/904b between the switch device 404 and the host device 410.)

Figure 9B:
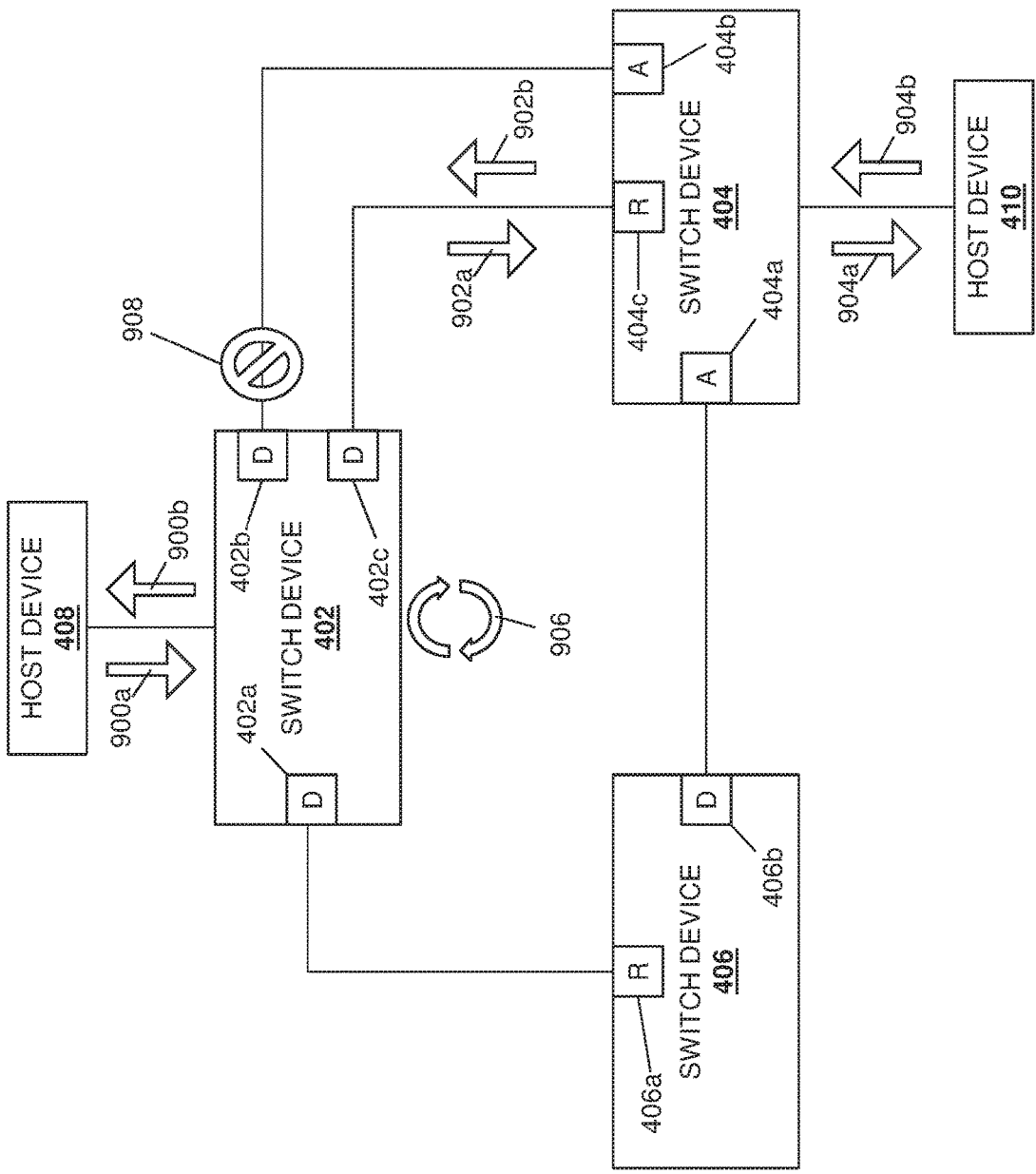
FIG. 9B is a schematic view illustrating the provisioning of a warm reboot in one of the switch devices in the network of FIG. 4.

With reference to FIG. 9B and as discussed above with regard to block 602 of the method 600, upon receiving a warm reboot signal that begins the warm reboot process 906 in the switch device 402, the switch device 402 operates to put the port 402b in a blocking mode 908 because the port p402b is assigned a designated port role and is linked to the port 404b that is assigned an alternate port role. As also discussed above with regard to block 604 of the method 600, upon receiving a warm reboot signal that begins the warm reboot process 906 in the switch device 402, the switch device 402 may install ingress filters that are configured to cause BPDUs, which are received at the ports 402*a-c* that are assigned the designated port role and that include a peer port role of designated, to be redirected back to the port that sent that BPDU. As also discussed above with regard to block 604 of the method 600, upon receiving a warm reboot signal that begins the warm reboot process 906 in the switch device 402, the switch device 402 may install ingress filters that are configured to count topology change notifications received at the ports 402*a-c*.

Figure 9C:
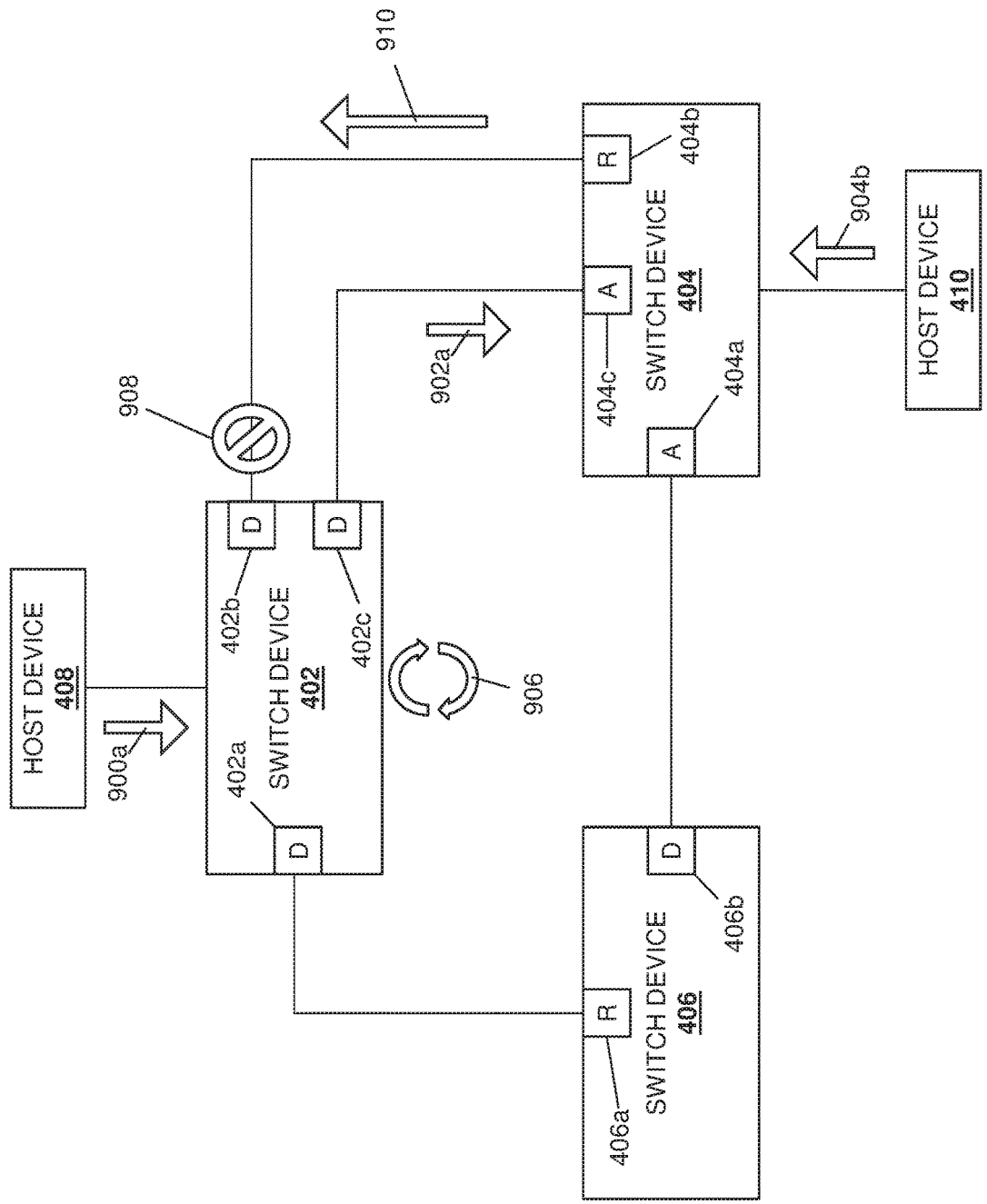
FIG. 9C is a schematic view illustrating the provisioning of a warm reboot in one of the switch devices in the network of FIG. 4.
Figure 9D:
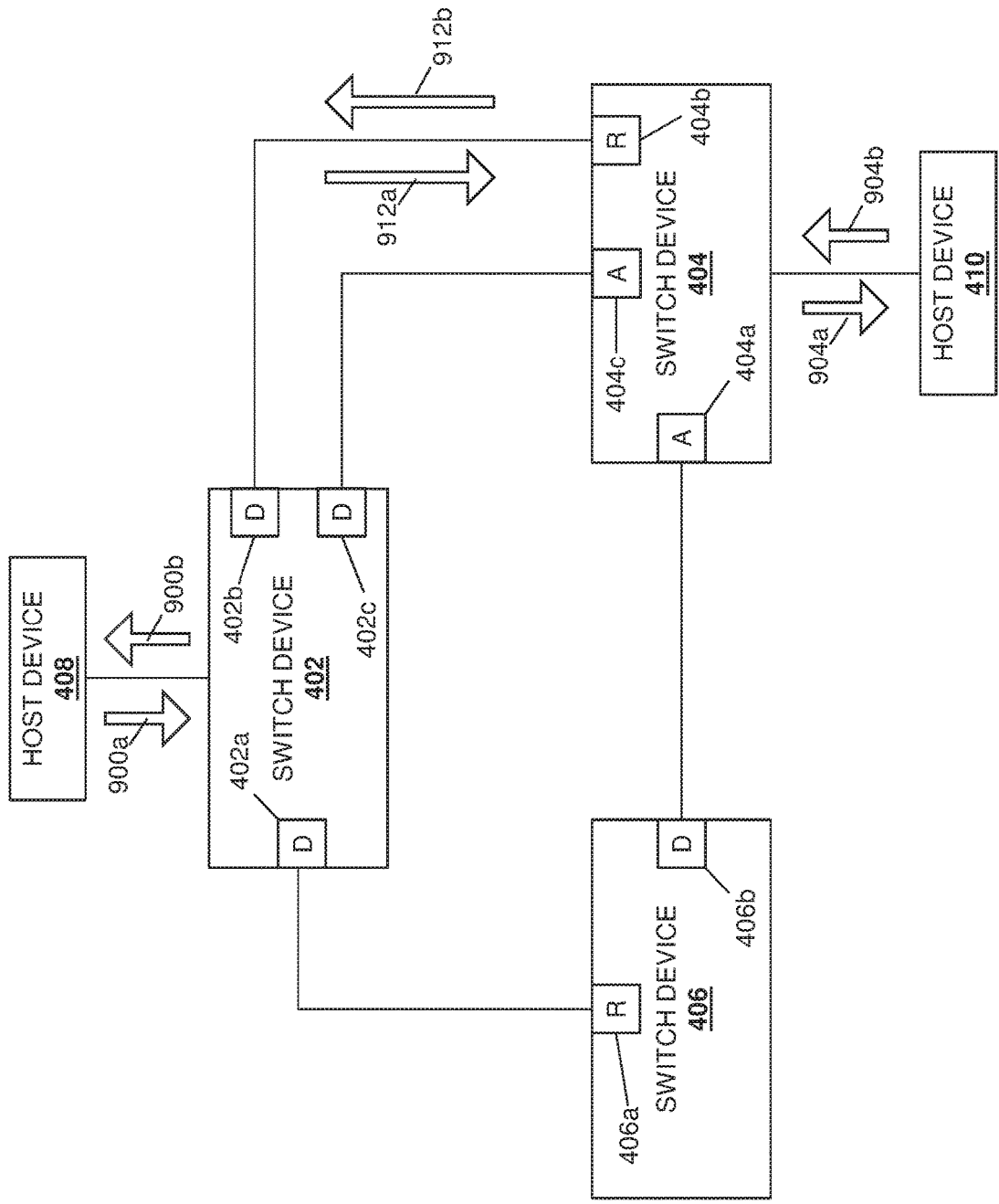
FIG. 9D is a schematic view illustrating the provisioning of a warm reboot in one of the switch devices in the network of FIG. 4.

With reference to FIG. 9C, during the warm reboot process 906 in the switch device 402, the port 404*c* may be prioritized over the port 404*b*, causing the port 404*c* to be reassigned an alternate port role, and port 404*b* to be reassigned a root port role. As indicated by the removal of the arrows 900*b*, 902*b*, and 904*a* in FIG. 9C, this port reprioritization in the switch device 404 and subsequent reassignment of port roles creates a traffic "black hole" in which communications "disappear" at (i.e., are not conveyed by) the switch device 404. As illustrated in FIG. 9C, port 404*b* may then send a topology change notification BPDU 910 to the port 402*b* that, as discussed above with regard to block 608 of the method 600, will not be processed by the switch device 402 (i.e., because it is undergoing the warm reboot process 906), but that will cause the switch device 402 to increment a counter associated with the port 402*b*. With reference to FIG. 9D, as discussed above with reference to block 616 of the method 600, subsequent to the warm reboot process 906 in the switch device 402, the switch device 402 will identify the non-zero counter associated with the port 402*b* and, in response, will flush its MAC tables and generate a topology change notification that is sent out on all its forwarding ports, thus clearing the traffic black hole (as indicated by the reestablished arrows 900*b* and 904*a*, as well as arrows 912*a*/912*b* between port 402*b* on the switch device 402 and port 404*b* on switch device 404.)

Thus, systems and methods have been described that provide for the warm reboot of control plane software in a switch device in a network that uses the spanning tree protocol without leading to traffic loops or other traffic disturbances. This is enabled, at least in part, by having the switch device block its designated ports that are connected to peer ports with an alternate port role or designated-discarding port role, and send Bridge Protocol Data Units (BPDUs) with an extended hello-time. The switch device then installs Access Control Lists (ACLs) on each of its designated ports that cause spanning tree BPDUs that are received from other switch devices during the warm reboot process with a peer role at "designated" to be sent back to those switch devices, and that count the number of topology change notifications received at those ports during the warm reboot process. Subsequent to the warm reboot, the switch device removes the ACLs/filters and reprograms its ports based on the current port states in the network. If the switch device determines ports have received topology change notifications during the warm reboot process, it flushes its Media Access Control (MAC) table and send topology change notifications on all forwarding ports in order to clear traffic black holes that may exist in the network subsequent to the warm reboot process. As would be appreciated by one of skill in the art in possession of the present disclosure, the systems and methods of the present disclosure may be used with different varieties of the spanning tree protocol (RSTP, MSTP, RPVSTP, etc.), is interoperable with a variety of switches devices with standard spanning tree protocol implementations, does not require external software or hardware support (e.g., like Field Programmable Gate Arrays (FPGAs)), and will function with spanning tree protocol hitless restart as well.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A spanning tree protocol warm reboot system, comprising:
    at least one first switch device including first switch ports; and
    a second switch device including second switch ports that are linked to respective first switch ports on the at least one first switch device, wherein the second switch device is configured, during a warm reboot, to:
        block second switch ports that have a designated state and that are linked to first switch ports that have either an alternate role or a discarding state;
        redirect, on second switch ports that have the designated state, bridge protocol data units (BPDUs) that identify a designated peer port role and that are received from their respective linked first switch ports back to those first switch ports; and
        identify, on the second switch ports, at least one topology change notification received by those second switch ports; and
    wherein the second switch device is configured, subsequent to the warm reboot, to:
        reprogram second switch ports that have experienced a state change during the warm reboot; and
        send, based on identifying the at least one topology change notification received by the second switch ports during the warm reboot, a topology change notification on a forwarding second switch port.

2. The system of claim 1, wherein the second switch device is configured, in response to receiving a warm reboot signal, to:
    provide, on the second switch ports that have the designated state, a first filter that causes the first BPDUs received from their respective first switch ports to be redirected back to those first switch ports; and
    wherein the second switch device is configured, subsequent to the warm reboot, to:
        remove, from the second switch ports that have the designated state, the first filter.

3. The system of claim 1, wherein the second switch device is configured, in response to receiving a warm reboot signal, to:
    provide, on the second switch ports, a second filter that causes the identification of the at least one topology change notification received by those second switch ports; and
    wherein the second switch device is configured, subsequent to the warm reboot, to:
        remove, from the second switch ports, the second filter.

4. The system of claim 1, wherein the second switch device is configured, in response to receiving a warm reboot signal, to:

send, on the second switch ports that have the designated state, second BPDUs with a hello time of at least 30 seconds.

5. The system of claim 1, wherein the second switch device is configured, subsequent to the warm reboot, to:
use operational parameters stored in a database to generate port state machine states; and
send second BPDUs including the port state machines states through the second switch ports.

6. The system of claim 1, wherein the second switch device is configured, subsequent to the warm reboot, to:
flush a Media Access Control (MAC) address table prior to sending the topology change notification(s).

7. An Information Handling System (IHS), comprising:
a plurality of first ports;
a processing system that is coupled to the plurality of first ports; and
a memory system that is coupled to the processing system and that includes instructions that, when executed by the processing system, cause the processing system to provide a spanning tree protocol engine that is configured, during a warm reboot, to:
block each of the plurality of first ports that have a designated state and that are linked to respective second ports that have either an alternate role or a discarding state;
redirect, for each of the plurality of first ports that have the designated state, first protocol data units (BPDUs) that identify a designated peer port role back to their source; and
identify, on each of the plurality of first ports, at least one topology change notification received by those first ports; and
wherein the spanning tree protocol engine is configured, subsequent to the warm reboot, to:
reprogram at least some of the plurality of first ports that have experienced a state change during the warm reboot; and
send, based on identifying the at least one topology change notification received by the first ports during the warm reboot, a topology change notification on a forwarding port.

8. The IHS of claim 7, wherein the spanning tree protocol engine is configured, in response to receiving a warm reboot signal, to:
provide, on each of the plurality of first ports that have the designated state, a first filter that causes the first BPDUs to be redirected back to their source; and
wherein the spanning tree protocol engine is configured, subsequent to the warm reboot, to:
remove, from the each of the plurality of first ports that have the designated state, the first filter.

9. The IHS of claim 7, wherein the spanning tree protocol engine is configured, in response to receiving a warm reboot signal, to:
provide, on each of the plurality of first ports, a second filter that causes the identification of the at least one topology change notification received by those plurality of first ports; and
wherein the spanning tree protocol engine is configured, subsequent to the warm reboot, to:
remove, from the each of the plurality of first ports, the second filter.

10. The IHS of claim 7, wherein the spanning tree protocol engine is configured, in response to receiving a warm reboot signal, to:
send, on each of the plurality of first ports that have the designated state, second BPDUs with a hello time of at least 30 seconds.

11. The IHS of claim 7, wherein the spanning tree protocol engine is configured, subsequent to the warm reboot, to:
use operational parameters stored in a database to generate port state machine states; and
send second BPDUs including the port state machines states through each of the plurality of first ports.

12. The IHS of claim 7, wherein the spanning tree protocol engine is configured, subsequent to the warm reboot, to:
flush a Media Access Control (MAC) address table prior to sending the topology change notification(s).

13. The IHS of claim 7, wherein the spanning tree protocol engine is configured to provide at least one of the rapid spanning tree protocol, the multiple spanning tree protocol, and the rapid per-Virtual Local Area Network (VLAN) spanning tree protocol.

14. A method for providing spanning tree protocol warm reboots, comprising:
blocking, by a first switch device during a warm reboot of the first switch device, first switch ports on the first switch device that have a designated state and that are linked to second switch ports on a second switch device that have either an alternate role or a discarding state;
redirecting, during the warm reboot by the first switch device on first switch ports that have the designated state, first bridge protocol data units (BPDUs) that identify a designated peer port role and that are received from their respective linked second switch ports back to those second switch ports; and
identifying, during the warm reboot by the first switch device on the first switch ports, at least one topology change notification received by those first switch ports;
reprogramming, subsequent to the warm reboot by the first switch device, at least some of the first switch ports that have experienced a state change during the warm reboot; and
sending, subsequent to the warm reboot by the first switch device and based on identifying the at least one topology change notification received by the first switch ports during the warm reboot, a topology change notification on a forwarding first switch port.

15. The method of claim 14, further comprising:
provide, by the first switch device on first switch ports that have the designated state in response to receiving a warm reboot signal, a first filter that causes the first BPDUs received from their respective linked first switch ports to be redirected back to those second switch ports; and
removing, subsequent to the warm reboot by the first switch device from the first switch ports that have the designated state, the first filter.

16. The method of claim 14, further comprising:
providing, by the first switch device on first switch ports that have the designated state in response to receiving a warm reboot signal, a second filter that causes the identification of the at least one topology change notification received by those first switch ports; and
removing, subsequent to the warm reboot by the first switch device from the first switch ports that have the designated state, the second filter.

17. The method of claim 14, further comprising:
sending, by the first switch device on first switch ports that have the designated state in response to receiving a warm reboot signal, second BPDUs with a hello time of at least 30 seconds.

18. The method of claim 14, further comprising:
using, subsequent to the warm reboot by the first switch device, operational parameters stored in a database to generate port state machine states; and
sending, subsequent to the warm reboot by the first switch device, second BPDUs including the port state machines states through the first switch ports.

19. The method of claim 14, further comprising:
flushing, subsequent to the warm reboot by the first switch device, a Media Access Control (MAC) address table prior to sending the topology change notification(s).

20. The method of claim 14, wherein first switch device and the second switch device are configured to provide at least one of the rapid spanning tree protocol, the multiple spanning tree protocol, and the rapid per-Virtual Local Area Network (VLAN) spanning tree protocol.

\* \* \* \* \*